United States Patent
Liu et al.

(10) Patent No.: US 9,480,018 B2
(45) Date of Patent: Oct. 25, 2016

(54) PHY DATA UNIT FORMAT FOR MIMO

(75) Inventors: Yong Liu, Campbell, CA (US);
Hongyuan Zhang, Fremont, CA (US);
Raja Banerjea, Sunnyvale, CA (US);
Mao Yu, San Jose, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 12/938,260

(22) Filed: Nov. 2, 2010

(65) Prior Publication Data

US 2011/0103280 A1 May 5, 2011

Related U.S. Application Data

(60) Provisional application No. 61/257,768, filed on Nov. 3, 2009, provisional application No. 61/354,013, filed on Jun. 11, 2010.

(51) Int. Cl.
*H04W 4/00* (2009.01)
*H04W 52/02* (2009.01)
(Continued)

(52) U.S. Cl.
CPC ..... *H04W 52/0229* (2013.01); *H04W 74/0808* (2013.01); *H04W 84/12* (2013.01); *Y02B 60/50* (2013.01)

(58) Field of Classification Search
USPC .......................................................... 370/311
See application file for complete search history.

(56) References Cited

U.S. PATENT DOCUMENTS 6,912,249 B2   6/2005 Haartsen
8,144,647 B2   3/2012 Nabar et al.
8,149,811 B2   4/2012 Nabar et al.
(Continued)

FOREIGN PATENT DOCUMENTS

CN   1918818      2/2007
EP   1693972 A2   8/2006
(Continued)

OTHER PUBLICATIONS

IEEE Std 802.11a-1999; "Supplement to IEEE Standard for Information technology—Telecommunications and information exchange between systems—Local and metropolitan area networks—Specific requirements: Part 11: Wireless LAN Medium Access Control (MAC) and Physical Layer (PHY) specifications High-speed Physical Layer in the 5 GHz Band"; 1999; pp. 1-83; Institute of Electrical and Electronics Engineers, Inc.; New York, NY.

(Continued)

*Primary Examiner* — Jason Mattis
*Assistant Examiner* — Kevin Cunningham

(57) ABSTRACT

A method in a communication device for processing a received data unit includes determining whether the communication device is an intended receiver based on the received data unit, determining whether the received data unit includes an exclusive use indication, where the exclusive use indication indicates that a plurality of data units are transmitted only to the at least one intended receiver during a time period, where each of the plurality of data units has at least a respective physical layer (PHY) preamble, and determining a time interval during which the communication device need not listen for incoming data units using (i) a result of determining whether the received data unit includes an exclusive use indication and (ii) a result of determining whether the communication device is an intended receiver.

21 Claims, 16 Drawing Sheets

110

| 112 | 114 | 116-1 | 116-2 | 116-3 | 116-4 |
|---|---|---|---|---|---|
| MU INDICATION = MU | GID | $N_{STS}$-1 | $N_{STS}$-2 | $N_{STS}$-3 | $N_{STS}$-4 |

120

| 122 | 124 | 126-1 | 126-2 | 126-3 | 126-4 |
|---|---|---|---|---|---|
| MU INDICATION = SU | RCVR FLTR-1 | $N_{STS}$-1 | RCVR FLTR-2 | RCVR FLTR-3 | RCVR FLTR-4 |

(51) Int. Cl.
*H04W 74/08* (2009.01)
*H04W 84/12* (2009.01)

(56) References Cited

U.S. PATENT DOCUMENTS

| | | | |
|---|---|---|---|
| 8,270,909 B2 | 9/2012 | Zhang et al. | |
| 8,472,383 B1 | 6/2013 | Banerjea et al. | |
| 8,724,546 B2 | 5/2014 | Zhang et al. | |
| 2005/0025080 A1* | 2/2005 | Liu | 370/311 |
| 2005/0043027 A1 | 2/2005 | Emeott et al. | |
| 2005/0276347 A1 | 12/2005 | Mujtaba et al. | |
| 2005/0286474 A1 | 12/2005 | van Zelst et al. | |
| 2006/0045035 A1* | 3/2006 | Liu | 370/311 |
| 2006/0182017 A1 | 8/2006 | Hansen et al. | |
| 2007/0047666 A1 | 3/2007 | Trachewsky | |
| 2007/0058566 A1* | 3/2007 | Frederiks et al. | 370/253 |
| 2007/0104089 A1 | 5/2007 | Mujtaba | |
| 2007/0230403 A1 | 10/2007 | Douglas et al. | |
| 2007/0275671 A1* | 11/2007 | Hwang et al. | 455/73 |
| 2008/0095091 A1* | 4/2008 | Surineni et al. | 370/311 |
| 2009/0022128 A1 | 1/2009 | Nabar et al. | |
| 2009/0196163 A1 | 8/2009 | Du | |
| 2009/0252110 A1 | 10/2009 | Sridhara et al. | |
| 2010/0046358 A1 | 2/2010 | van Nee | |
| 2010/0046656 A1 | 2/2010 | van Nee et al. | |
| 2010/0080173 A1* | 4/2010 | Takagi | 370/328 |
| 2010/0165907 A1* | 7/2010 | Chu et al. | 370/312 |
| 2010/0260159 A1 | 10/2010 | Zhang et al. | |
| 2010/0290449 A1 | 11/2010 | van Nee et al. | |
| 2010/0309834 A1 | 12/2010 | Fischer et al. | |
| 2010/0309848 A1 | 12/2010 | Erceg et al. | |
| 2010/0309868 A1* | 12/2010 | Yang et al. | 370/329 |
| 2011/0002219 A1 | 1/2011 | Kim et al. | |
| 2011/0002319 A1* | 1/2011 | Husen et al. | 370/338 |
| 2011/0032875 A1 | 2/2011 | Erceg et al. | |
| 2011/0063991 A1 | 3/2011 | Sampath et al. | |
| 2011/0064040 A1 | 3/2011 | Kim et al. | |
| 2011/0075607 A1 | 3/2011 | Kim et al. | |
| 2011/0096796 A1 | 4/2011 | Zhang et al. | |
| 2011/0096797 A1 | 4/2011 | Zhang et al. | |
| 2011/0110454 A1 | 5/2011 | Sampath et al. | |
| 2011/0188598 A1 | 8/2011 | Lee et al. | |
| 2011/0222490 A1 | 9/2011 | Fischer et al. | |
| 2011/0299382 A1 | 12/2011 | Van Nee et al. | |
| 2012/0281774 A1 | 11/2012 | Lee et al. | |
| 2012/0327862 A1 | 12/2012 | Lee et al. | |
| 2013/0286925 A1 | 10/2013 | Fischer et al. | |
| 2014/0078966 A1 | 3/2014 | Erceg et al. | |
| 2014/0241458 A1 | 8/2014 | Zhang et al. | |
| 2014/0362845 A1 | 12/2014 | Lee et al. | |
| 2015/0023291 A1 | 1/2015 | Lee et al. | |

FOREIGN PATENT DOCUMENTS

| | | |
|---|---|---|
| JP | 2005-277647 A | 10/2005 |
| JP | 2007-82189 | 3/2007 |
| KR | 10-2009-0082227 | 7/2009 |
| WO | WO-2006/001898 A1 | 1/2006 |
| WO | WO-2006/115999 A2 | 11/2006 |
| WO | WO-2007/032413 A1 | 3/2007 |
| WO | WO 2008/115282 A2 | 9/2008 |
| WO | WO-2011/056790 A1 | 5/2011 |

OTHER PUBLICATIONS

IEEE Std 802.11b-1999/Cor 1•2001; "IEEE Standard for Information technology—Telecommunications and information exchange between systems—Local and metropolitan area networks—Specific requirements: Part 11: Wireless LAN Medium Access Control (MAC) and Physical Layer (PHY) specifications, Amendment 2: Higher-speed Physical Layer (PHY) extension in the 2.4 GHz band—Corrigendum 1"; 2001; pp. 1-15; Institute of Electrical and Electronics Engineers, Inc.; New York, NY.

IEEE P802.11g/D8.2; "Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band"; 2003; pp. 1-69; Institute of Electrical and Electronics Engineers, Inc.; New York, NY.

Kiran Gunnam, Gwan Choi, Weihuang Wang, Mark Yeary; "Multi-Rate Layered Decoder Architecture for Block LDPC Codes of the IEEE 802.11n Wireless Standard"; 2007; pp. 1-4; Institute of Electrical and Electronics Engineers, Inc.; New York, NY.

International Search Report in corresponding PCT/US2010/055118, 4 pages, dated Jan. 7, 2011.

Written Opinion in corresponding PCT/US2010/055118, 9 pages, dated Jan. 7, 2011.

International Preliminary Report on Patentability for International Application No. PCT/US2010/055118, dated May 8, 2012.

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, (1999).

IEEE Std 802.11b-1999 (Supplement to ANSI/IEEE Std 802.11, 1999 Edition) "Supplement to IEEE Standard for Information technology—Telecommunications and information exchange between systems—Local and metropolitan area networks—Specific requirements Part 11: Wireless LAN Medium Access Control (MAC) and Physical Layer (PHY) specifications: Higher-speed Physical Layer Extension in the 2.4 GHZ Band," *The Institute of Electrical and Electronics Engineers, Inc.*, 1999.

IEEE Std 802.11b-1999/Cor 1-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHZ band-Corrigendum 1," *The Institute of Electrical and Electronics Engineers, Inc.*, Nov. 2001.

IEEE Std 802.11g/D2.8, May 2002 (Supplement to ANSI/IEEE Std 802.11, 1999 Edition) "Draft Supplement to Standard [for] Information technology—Telecommunications and information exchange between systems—Local and metropolitan area networks—Specific requirements—Part 11: Wireless LAN Medium Access Control (MAC) and Physical Layer (PHY) specifications: Further Higher-Speed Physical Layer Extension in the 2.4 GHz Band," *The Institute of Electrical and Electronics Engineers, Inc.*, May 2002.

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, Apr. 2003.

S. A. Mujtaba, "IEEE P802.11—Wireless LANs, TGn Sync Proposal Technical Specification,"*The Institute of Electrical and Electronics Engineers, Inc.*, doc.: IEEE 802.11—04/0889r6, May 2005.

IEEE P802.11n™/D3.00, Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput, *The Institute of Electrical and Electronics Engineers, Inc.*, Sep. 2007.

(56) References Cited

OTHER PUBLICATIONS

IEEE Std. 802.11n™ IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput, *The Institute of Electrical and Electronics Engineers, Inc.*, Oct. 2009.

Gunnam, et al., "Multi-Rate Layered Decoder Architecture for Block LDPC Codes of the IEEE 802.11n Wireless Standard," IEEE International Symposium on Circuits and Systems, 2007 (ISCAS 2007), pp. 1645-1648 (2007).

IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, (Jun. 12, 2007).

Notification of First Office Action in corresponding Chinese Application No. 201080047912.4 dated May 5, 2014, with English translation attached (18 pages).

Notice of Reasons for Rejection in corresponding Japanese Application No. 2012-537191 dated Sep. 9, 2014, with English translation attached (3 pages).

Office Action in related U.S. Appl. No. 12/910,608, dated Sep. 13, 2012 (36 pages).

Office Action in related U.S. Appl. No. 12/910,608, dated Jan. 3, 2013 (33 pages).

Office Action in related U.S. Appl. No. 12/910,608, dated Apr. 17, 2013 (36 pages).

Office Action in related U.S. Appl. No. 12/910,608, dated Nov. 6, 2013 (44 pages).

Notice of Allowance in related U.S. Appl. No. 12/910,608, dated Mar. 3, 2014 (8 pages).

Notice of Allowance in related U.S. Appl. No. 12/910,608, dated Jun. 23, 2014 (8 pages).

Notice of Allowance in related U.S. Appl. No. 12/910,608, dated Sep. 2, 2014 (8 pages).

Office Action in related U.S. Appl. No. 12/910,628, dated Oct. 10, 2012 (9 pages).

Office Action in related U.S. Appl. No. 12/910,628, dated Jun. 26, 2013 (11 pages).

Notice of Allowance in related U.S. Appl. No. 12/910,628, dated Dec. 30, 2013 (10 pages).

Office Action in related U.S. Appl. No. 14/269,976, dated Jul. 21, 2014 (8 pages).

First Office Action in related Chinese Application No. 201080046573.8, dated Apr. 2, 2014 (22 pages).

First Office Action in related Chinese Application No. 201080046510.2, dated Jun. 25, 2014 (9 pages).

Notice of Reasons for Rejection in related Japanese Application No. 2012-535431, dated Aug. 12, 2014 (3 pages).

Notice of Reasons for Rejection in related Japanese Application No. 2012-535432, dated Aug. 12, 2014 (4 pages).

International Search Report and Written Opinion for International Application No. PCT/US2010/053844, dated Feb. 10, 2011 (8 pages).

International Preliminary Report on Patentability and Written Opinion for International Application No. PCT/US2010/053844, dated Apr. 24, 2012 (5 pages).

International Search Report and Written Opinion for International Application No. PCT/US2010/053849, dated Feb. 10, 2011 (10 pages).

International Preliminary Report on Patentability and Written Opinion for International Application No. PCT/US2010/053849, dated Apr. 24, 2012 (6 pages).

International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.*, pp. 1-512 (1999).

IEEE Std P802.11-REVma/06.0, (Revision of IEEE Std 802.11-1999) "Unapproved Draft Standard for Information Technology—Telecommunications and information exchange between systems—Local and metropolitan area network—Specific requirements Part 11: Wireless LAN Medium Access Control (MAC) and Physical Layer (PHY) specifications," pp. 1-1212 (2006).

IEEE Std 802.11a-1999 (R2003) (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, pp. 1-92, (1999) Reaffirmed (Jun. 12, 2003).

IEEE Std 802.11g/D2.8, May 2002 (Supplement to ANSI/IEEE Std 802.11, 1999 Edition) "Draft Supplement to Standard [for] Information technology—Telecommunications and information exchange between systems—Local and metropolitan area networks—Specific requirements—Part 11: Wireless LAN Medium Access Control (MAC) and Physical Layer (PHY) specifications: Further Higher-Speed Physical Layer Extension in the 2.4 GHz Band," *The Institute of Electrical and Electronics Engineers, Inc.*, pp. 1-53 (May 2002).

Hiertz, et al., "The IEEE 802.11 Universe," *IEEE Communications Magazine*, pp. 62-70, (Jan. 2010).

Love et al., "An Overview of Limited Feedback in Wireless Communication Systems," IEEE J. on Selected Areas in Communications, vo. 26, No. 8, pp. 1341-1365 (Oct. 2008).

van Nee, et al. "The 802.11n MIMO-OFDM Standard for Wireless LAN and Beyond," Wireless Personal Communications, vol. 37, pp. 445-453 (Jun. 2006).

Zhang et al., "11ac Explicit Sounding and Feedback", *The Institute of Electrical and Electronics Engineers*, doc. No. IEEE 802.11-10/1105r0, 44 pages (Sep. 2010).

First Office Action in Chinese Application No. 201080046573.8, dated Apr. 2, 2014, with English translation (22 pages).

Second Office Action in Chinese Application No. 201080047912.4, dated Dec. 23, 2014, with English translation (19 pages).

Second Office Action in Chinese Application No. 201080046573.8, dated Jan. 6, 2015, with English translation (11 pages).

Communication pursuant to Article 94(3) EPC in European Application No. 10 778 776.4, dated Jan. 13, 2015 (8 pages).

Notice of Allowance in U.S. Appl. No. 12/910,608, mailed Jan. 13, 2015 (8 pages).

Communication Pursuant to Article 94(3) EPC in European Application No. 10 778 776.4, dated Jul. 31, 2015 (4 pages).

Third Office Action in Chinese Application No. 201080047912.4, dated Aug. 31, 2015, with English translation (6 pages).

Supplemental Notice of Allowability in U.S. Appl. No. 12/910,608, dated Feb. 23, 2015 (2 pages).

Notice of Allowance in U.S. Appl. No. 12/910,608, dated May 22, 2015 (8 pages).

Office Action in U.S. Appl. No. 14/269,976, dated Feb. 18, 2015 (17 pages).

Notice of Allowance in U.S. Appl. No. 14/269,976, dated Jul. 1, 2015 (8 pages).

Office Action in Chinese Application No. 201080046510.2, dated Feb. 9, 2015, with English translation (8 pages).

Office Action in Korean Application No. 10-2012-7009312, dated Apr. 21, 2016, with English translation (11 pages).

\* cited by examiner

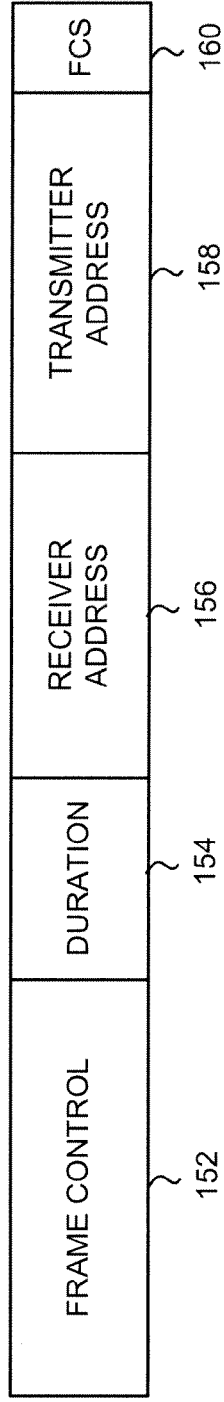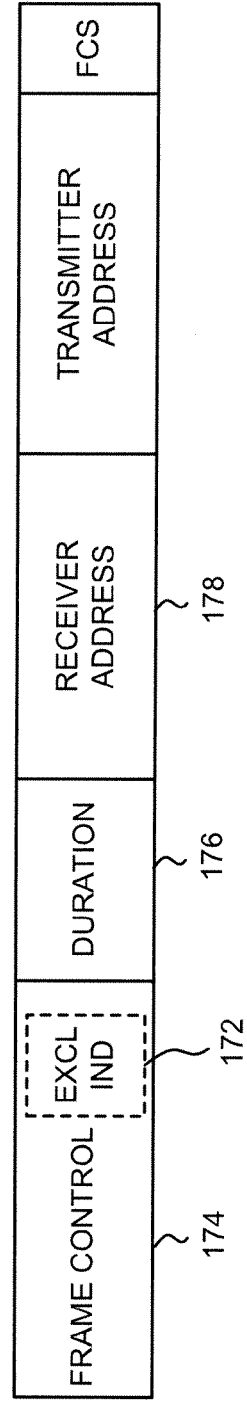
FIG. 5A (PRIOR ART)
FIG. 5B

| LINK ADAPTATION CONTROL | CALIBRATION POSITION | CALIBRATION SEQUENCE | RSRVD | EXCL IND (222A) | CSI/ STEERING | NDP ANNOUNCEMENT | RSRVD | EXCL IND (222B) | AC CONSTRAINT | RDG/ MORE PPDU |

| LINK ADAPTATION CONTROL | CALIBRATION POSITION | CALIBRATION SEQUENCE | GROUP ID (MSB) (232) | CSI/ STEERING | NDP ANNOUNCEMENT | GROUP ID (LSB) (234) | AC CONSTRAINT | RDG/ MORE PPDU |

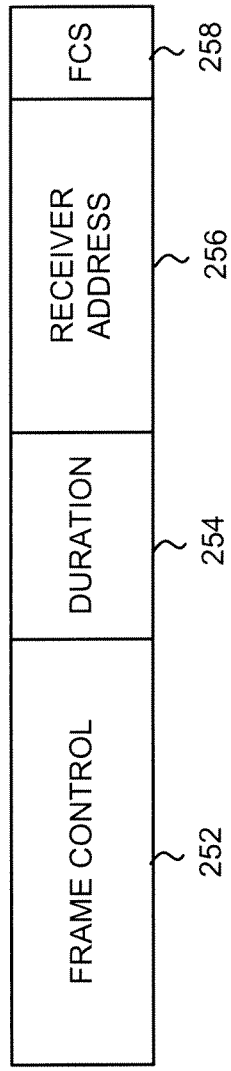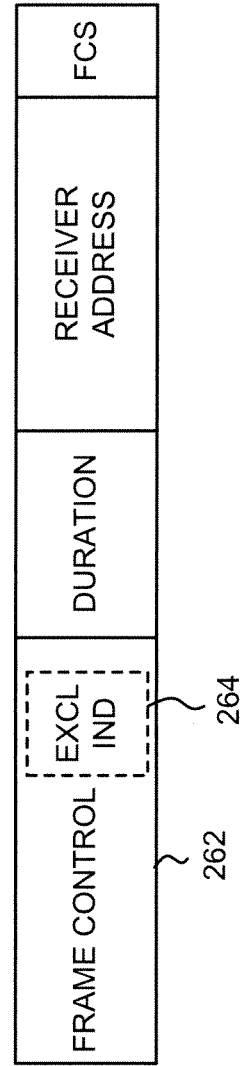
FIG. 8A (PRIOR ART)
FIG. 8B

PHY DATA UNIT FORMAT FOR MIMO

CROSS REFERENCE TO RELATED APPLICATIONS

This application claims the benefit of U.S. Provisional Patent Applications Nos. 61/257,768, entitled "Receiving Filtering by Using Preamble," filed Nov. 3, 2009, and 61/354,013, entitled "VHT Power Saving Enhancements," filed on Jun. 11, 2010, the entire disclosures of both of which are hereby expressly incorporated herein by reference.

FIELD OF TECHNOLOGY

The present disclosure relates generally to communication systems and, more particularly, to power saving techniques in such communication systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Wireless local area networks (WLANs) have evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, and the IEEE 802.11n Standard specifies a single-user peak throughput of 600 Mbps. Work has begun on a new standard, IEEE 802.11ac, that promises to provide even greater throughput.

SUMMARY

In an embodiment, a method in a communication device for processing a received data unit includes determining whether the communication device is an intended receiver based on the received data unit, determining whether the received data unit includes an exclusive use indication, where the exclusive use indication indicates that a plurality of data units are transmitted only to the at least one intended receiver during a time period, where each of the plurality of data units has at least a respective physical layer (PHY) preamble, and determining a time interval during which the communication device need not listen for incoming data units using (i) a result of determining whether the received data unit includes an exclusive use indication and (ii) a result of determining whether the communication device is an intended receiver.

In another embodiment, a method in a communication device for generating a data unit for transmission via a communication channel includes generating a first field of the data unit to specify an identity of at least one intended receiver of the data unit, and generating a second field of the data unit including an exclusive use indication, where the exclusive use indication indicates that a plurality of data units are to be transmitted only to the at least one intended receiver during a time period, where each of the plurality of data units has at least a respective physical layer (PHY) preamble.

In another embodiment, an apparatus for use in a communication device includes a data unit processor to determining whether the communication device is an intended receiver based on a received data unit, an exclusive use indication processor to determine whether the received data unit includes an exclusive use indication, where the exclusive use indication indicates that a plurality of data units are transmitted only to the at least one intended receiver during a time period, where each of the plurality of data units has at least a respective physical layer (PHY) preamble, and a sleep controller to determine a time interval during which the communication device need not listen for incoming data units using (i) a result of determining whether the received data unit includes an exclusive use indication and (ii) a result of determining whether the communication device is an intended receiver.

In another embodiment, an apparatus for use in a communication device includes a frame generation module to generate a first field of the data unit to specify an identity of at least one intended receiver of the data unit and an exclusive use indication generator to generate a second field of the data unit including an exclusive use indication, where the exclusive use indication indicates that a plurality of data units are to be transmitted only to the at least one intended receiver during a time period, where each of the plurality of data units has at least a respective physical layer (PHY) preamble.

BRIEF DESCRIPTION OF THE DRAWINGS

FIG. 5A is a diagram of a known RTS frame;

FIG. 5B is a diagram of an RTS frame that includes an exclusive use indication in a frame control field, according to an embodiment;

FIG. 7A is a diagram of a high-throughput (HT) control field with an exclusive use indication that can be included in the control wrapper frame of FIG. 6, according to an embodiment;

FIG. 7B is a diagram of an HT control field with a group identifier that can be included in the control wrapper frame of FIG. 6, according to an embodiment;

FIG. 8A is a diagram of a known CTS frame;

FIG. 8B is a diagram of a CTS frame that includes an exclusive use indication in a frame control field, according to an embodiment;

DETAILED DESCRIPTION

Figure 1:
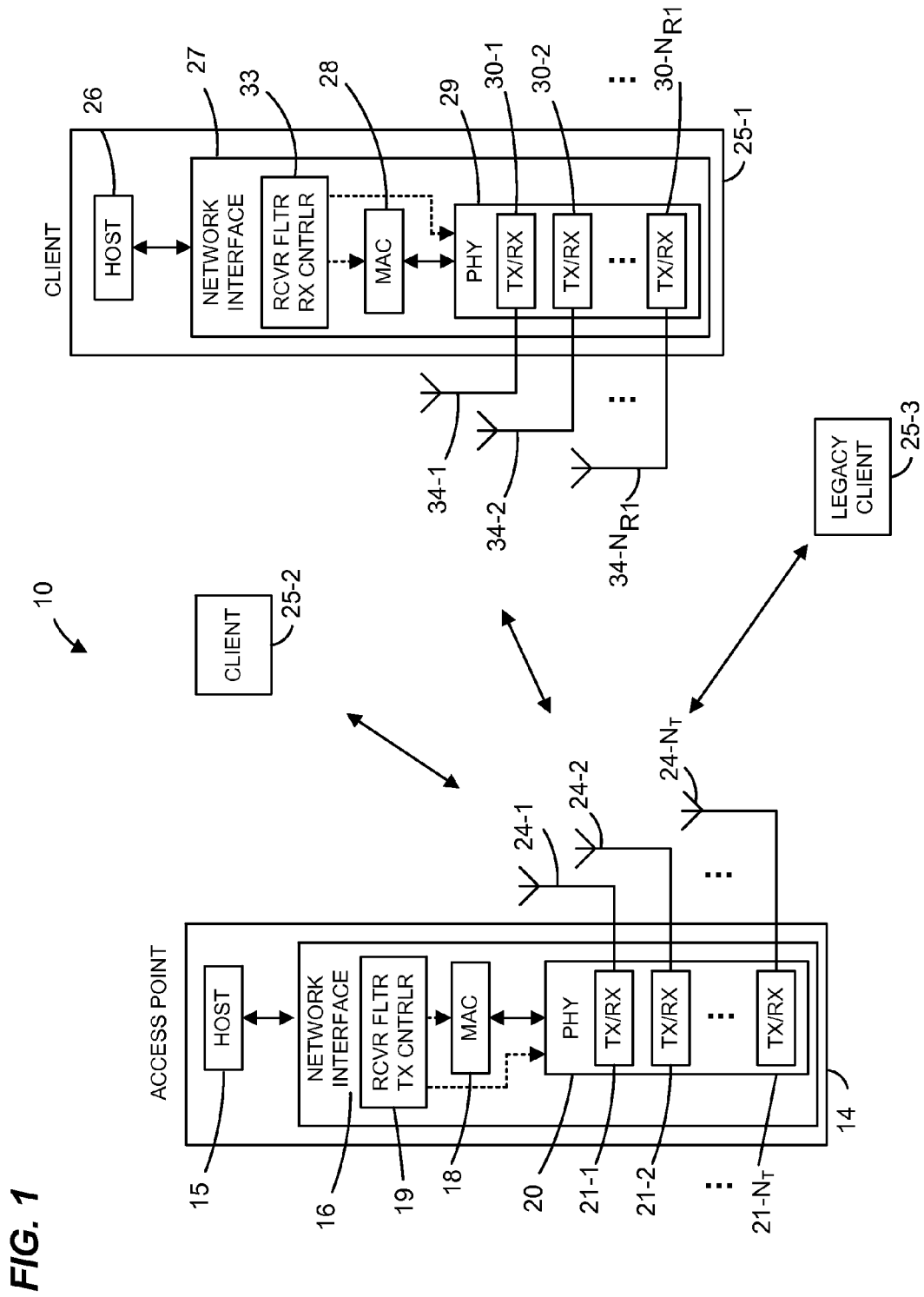
FIG. 1 is a block diagram of a communication system in which one or more device utilize power saving techniques of the present disclosure.

FIG. 1 is a block diagram of an example wireless local area network (WLAN) 10 in which a wireless network device such as an access point (AP) 14 generates a signal such as a communication frame including information that allows a certain receiver of the communication frame to efficiently determine a time interval during which the receiver can ignore further communications on a shared wireless channel 12 (hereinafter, the "sleep time interval"), according to an embodiment. In response to determining the sleep time interval, the receiver in some embodiments powers down at least its communication module, and accordingly saves power and processing time. In various embodiments discussed below, the AP 14 or another device operating in the WLAN 10 generates an indication that a certain time period such as, for example, a period associated with a certain network allocation vector (NAV) (e.g., a transmit opportunity (TxOP), a power save multi-poll (PSMP) period, a transmit-response sequence for a single user (SU) or multi-user (MU) case, a series of such sequences, a sequence of several communication frames, etc.) is reserved for exclusive use by one or more network devices, so that other network devices, can determine whether it is necessary to listen to potentially relevant communication frames during this period. As also discussed below, in some embodiments, network devices format a communication frame, to be transmitted to one or more particular network devices, so that a receiver of the communication frame can efficiently and accurately determine whether the communication frame is addressed to the receiver or another network device and, accordingly, conserve power by not processing the communication frame if it is not addressed to the receiver. For convenience, techniques for indicating and determining whether a certain time period is reserved for exclusive use by certain devices, techniques for efficiently and accurately detecting whether a communication frame is transmitted to a certain receiver of the communication frame, as well as techniques for determining, based on a certain portion of the communication frame, whether the receiver can decode the remainder of the communication frame, are referred to herein as "receive filtering" techniques.

In an embodiment, the WLAN 10 supports downlink (DL) multiuser (MU) multiple-input and multiple-output (MIMO) communication between the AP 14 and K client stations 25. Additionally, the WLAN 10 in at least some of the embodiments supports DL single-user (SU) communication between the AP and each of the plurality of client stations 25. The AP 14 and the client stations 25 can be referred to as "communication devices." In at least some implementations, the AP 14 and at least some of the stations 25 support group transmission mode in which a communication frame is communicated to a particular group of stations. As discussed in more detail below, a communication frame transmitted to a group of stations (hereinafter, an "MU group") can include client-specific portions simultaneously transmitted using different spatial streams or space-time streams. In at least some of the embodiments discussed herein, each communication frame is a data unit that includes a respective physical layer (PHY) preamble.

The AP 14 includes a host processor 15 coupled to a network interface 16. In an embodiment, the network interface 16 includes a medium access control (MAC) unit 18, and a PHY unit 20, and a receive filtering transmit (Tx) controller 19 coupled to one or both of the units 18 and 20. The PHY unit 20 further includes $N_T$ transceivers 21, and the transceivers are coupled to $N_T$ antennas 24. Although three transceivers 21 and three antennas 24 are illustrated in FIG. 1 (i.e., $N_T=3$), the AP 14 can include different numbers (e.g., $N_T=2$, 4, 5, etc.) of transceivers 21 and antennas 24 in other embodiments.

During operation, in an embodiment, the receive filtering Tx controller 19 determines whether a certain time interval should be reserved for exclusive use by a certain network device and causes the MAC unit 18 and/or the PHY unit 20 to generate an appropriate indication in one or both of the PHY or MAC layers, respectively. In another embodiment, the receive filtering Tx controller 19 causes the MAC unit 18 and/or the PHY unit 20 to generate a communication frame in such a way that, based on a portion of the received communication frame, a receiving device can quickly and accurately determine whether the rest of the communication frame should be processed.

With continued reference to FIG. 1, each station 25-$i$ is equipped with a respective number of antennas. Although three client stations 25 are illustrated in FIG. 1, the WLAN 10 can include different numbers (e.g., K=2, 4, 5, 6, etc.) of client stations 25 in various scenarios and embodiments. In an embodiment, two or more of the client stations 25 are configured to receive corresponding data streams having been simultaneously transmitted from the AP 14. Further, in an example scenario, several client stations 25 (e.g., stations 25-1 and 25-2) are temporarily associated with a MU group, and the AP 14 transmits one or more data frames in which client-specific portions are simultaneously transmitted to the station associated with the MU group using spatial multiplexing.

In an embodiment, a client station 25-1 includes a host processor 26 coupled to a network interface 27. The network interface 27 includes a MAC unit 28 and a PHY unit 29. The PHY unit 29 includes $N_{R1}$ transceivers 30, and the $N_{R1}$ transceivers 30 are coupled to $N_{R1}$ antennas 34. Although three transceivers 30 and three antennas 34 are illustrated in FIG. 1 (i.e., $N_{R1}$=3), the client station 25-1 can include different numbers of transceivers 30 and antennas 34 (e.g., $N_{R1}$=1, 2, 4, 5, etc.) in other embodiments. The client station 25-2 has a structure that is the same as or generally similar to the client station 25-1. In an embodiment, the client station 25-2 is structured like the client station 25-1 but has only two transceivers and two antennas (i.e., $N_{R2}$=2). In other embodiments, the client station 25-2 includes different numbers of antennas (e.g., 1, 3, 4, 5, etc.).

In an embodiment, the AP 14 is configured to transmit multiple spatial streams to the client stations 25-1 and 25-2, so that each of these stations receives data via a respective number of spatial streams. For example, the AP 14 simultaneously transmits data via five spatial streams, and the client station 25-1 receives data via three spatial streams, whereas the client station 25-2 receives data via two spatial streams. In general, a client station can utilize no more spatial streams than the number of antennas with which the client station is equipped. Further, when space-time coding is employed, the multiple spatial streams are sometimes referred to by those of ordinary skill in the art as space-time streams. If the number of space-time streams is less than the number of transmit chains, spatial mapping is employed, in some embodiments. For simplicity, simultaneous transmission of data from a network device to two or more network device via the same radio channel (e.g., frequency) is referred to herein as "MU transmission." In contrast, transmission of a communication frame to a particular single network device is referred to herein as "SU transmission." In an embodiment, network devices capable of generating communication frames for MU transmissions and processing MU transmissions are configured to operate at least according to a protocol referred to herein as very high throughput (VHT) protocol. In general, a network device that operates according to the VHT protocol is capable of generating and processing both MU and SU transmissions.

In an embodiment, the network interface 27 of the client station includes a receive filtering Rx controller 33 communicatively coupled to one or both of the MAC unit 28 and the PHY unit 29. When an incoming communication frame is detected, in an embodiment, the receive filtering Rx controller 33 utilizes one or several techniques of the present disclosure to efficiently determine whether the remaining portion of the communication frame should be processed. In some embodiments, the receive filtering Rx controller 33 also determines the time interval during which the client station 25-1 need not listen for incoming communication frames.

With continued reference to FIG. 1, the WLAN 10 also includes a client station 25-3 that is not configured to operate according to the VHT protocol but is configured to operate according to a legacy protocol (e.g., 802.11n), in some embodiments. The legacy protocol includes a high-throughput (HT) formats, in an embodiment. Such a client station 25-3 is referred to herein as a "legacy client station". In some embodiments, the WLAN 10 includes more than one legacy client station. In other embodiments, the WLAN 10 includes no legacy client stations.

Figure 2A:
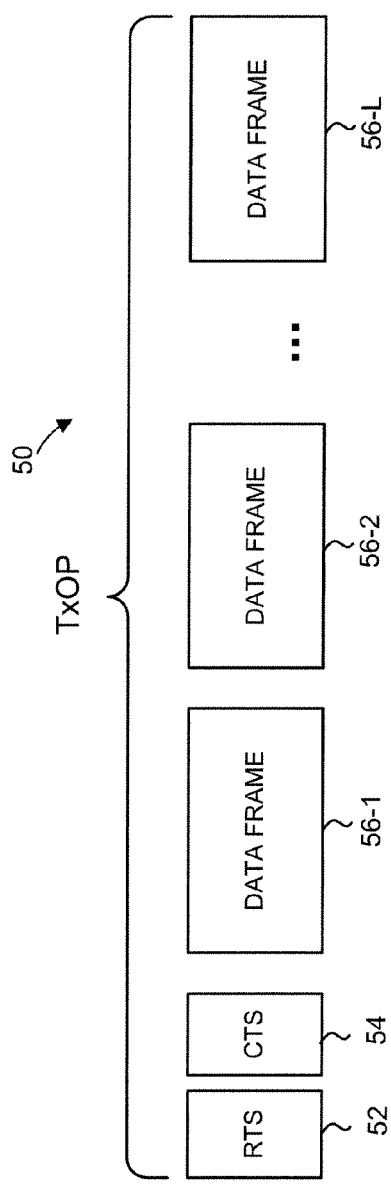
FIG. 2A is a diagram of a known transmission opportunity (TxOP) format that includes a request to send (RTS) frame, a clear to send (CTS) frame, and one or more data frames.
Figure 2B:
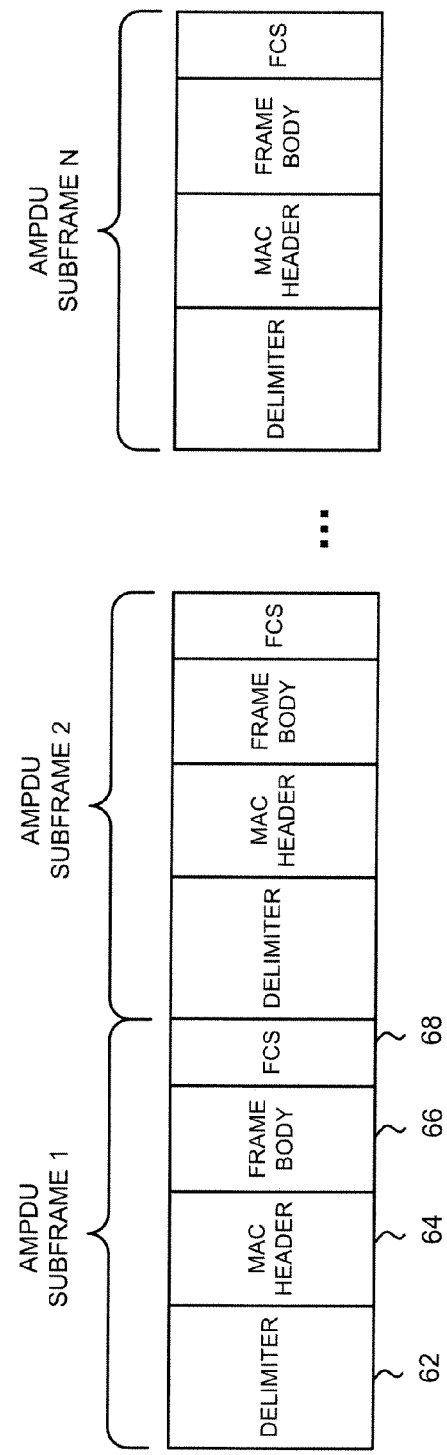
FIG. 2B is a diagram of a known aggregate Media Access Control (MAC) protocol data unit (AMPDU) that includes several AMPDU subframes.

For clarity, prior to discussing example receive filtering techniques of the present disclosure in more detail, a known transmission opportunity (TxOP) format and a known format of an aggregate Media Access Control (MAC) protocol data unit are considered with reference to FIG. 2A and FIG. 2B, respectively.

First referring to FIG. 2A, a TxOP 50 in communication systems such as WLAN 10 generally corresponds to a time period during which a network device gains access to a shared communication channel. To ensure that multiple network devices do not transmit at the same time (which may result in a collision), a network device transmits a request to send (RTS) 52 and receives a clear to send (CTS) 54 in response. For example, a client station 25-1 transmits an RTS to the AP 14 and does not begin to transmit data frames until a corresponding CTS is received from the AP 14. In this manner, if another station transmits an RTS to the AP 14 at the same or nearly the same time as the client station 25-1, the AP 14 grants access to the communication channel for the duration of the TxOP 50 to only one station (for example, to the station from which the RTS is received first).

Upon receiving a CTS, a client station (or an AP) proceeds to transmit one or more data frames 56-1, 56-2, 56-L. All client stations and the AP listen to incoming communication frames during the TxOP 50 to ensure a communication frame is not missed.

FIG. 2B is a diagram of a known aggregate MAC protocol data unit (AMPDU) 60 that includes AMPDU subframes 1, 2, ... N. In some cases, segmentation and reassembly principles associated with the MAC layer (e.g., a limit imposed on frame length) require that communication devices format a certain amount of data into several AMPDU subframes that are then assembled into a single AMPDU and transmitted as a VHT-AMPDU portion of a single PHY data unit, for example. An example technique for transmitting a VHT-AMPDU in a VHT-AMPDU portion of a communication frame is discussed below with reference to FIG. 2C.

As illustrated in FIG. 2B, each AMPDU subframe includes a delimiter 62 to indicate the beginning of the AMPDU subframe, a MAC header 64, a (MAC) frame body 66, and a frame check sequence (FCS) field 68 to verify the integrity of the fields 64 and 66. According to the known techniques of generating and processing an AMPDU that includes multiple AMPDU subframes, all subframes in an AMPDU are transmitted to the same receiver.

Figure 2C:
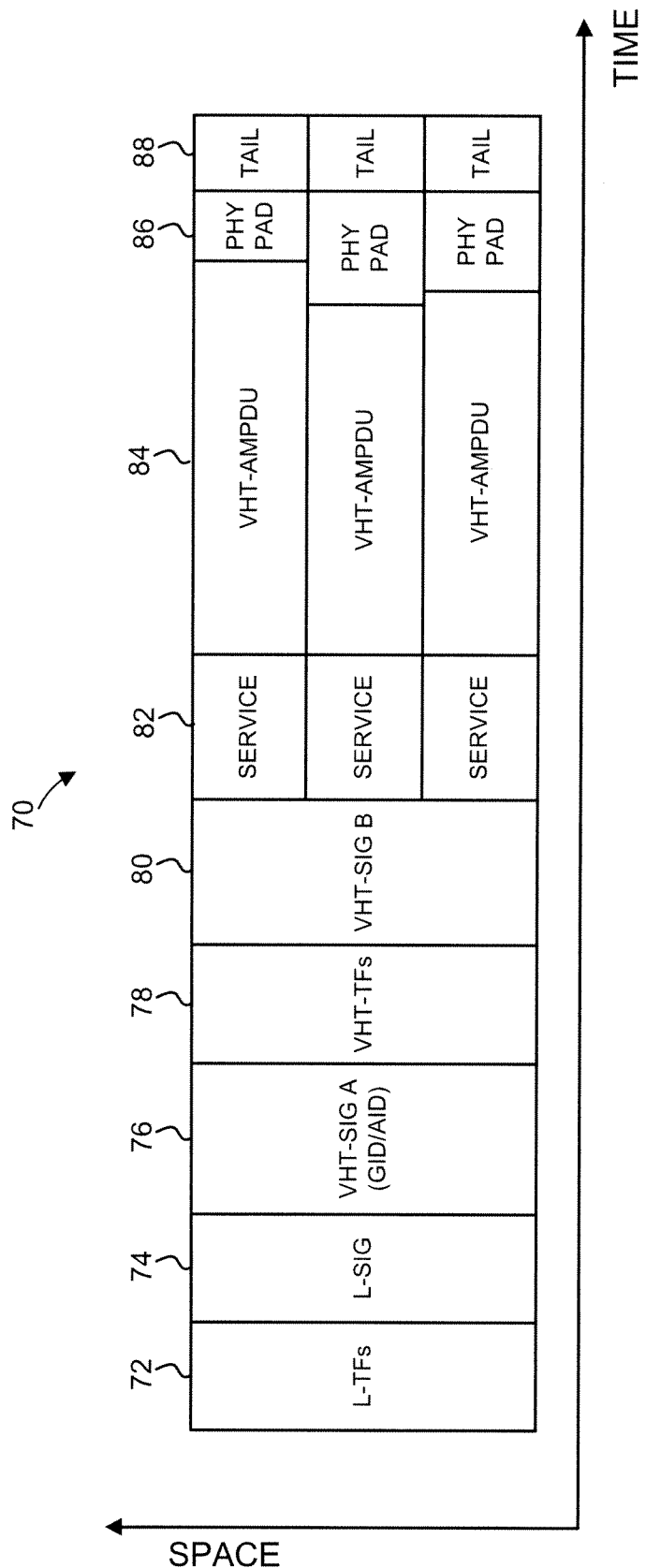
FIG. 2C is a diagram of a communication frame in which a portion of the frame is spatially multiplexed for simultaneous transmission to several receiving devices, according to an embodiment.

In an embodiment, an AMPDU consistent with the format illustrated in FIG. 2B is transmitted using a data unit 70 (e.g., a communication frame) discussed next with reference to FIG. 2C. A network device such as the AP 14 is configured to transmit the data unit 70 to client stations using orthogonal frequency division multiplexing (OFDM) modulation, according to an embodiment. The data unit 70 is an MU communication frame in which user-specific information is transmitted to respective users (e.g., client stations) using spatial multiplexing, according to an embodiment.

The data unit 70 includes a preamble having legacy training fields (L-TFs) 72 that in turn include a legacy short training field (L-STF) and one or more legacy long training fields (L-LTFs), according to an embodiment. The data unit 70 further includes a legacy signal field L-SIG 74. The fields 72 and 74 form a legacy portion of the data unit 70. In at least some of the embodiments, the L-STFs and the L-LTFs in the field 72, as well as the L-SIG field 74, conforms to a format specified by a legacy protocol such as the IEEE 802.11a Standard and/or the IEEE 802.11n Standard. The length and rate subfields in the L-SIGs 74 are set to indicate the duration of the remainder of the data unit 70 following the legacy portion. This permits client stations that are not configured according to the VHT protocol to determine an end of the data unit 70 for carrier sense multiple access/collision avoidance (CSMA/CA) purposes, for example. In at least some embodiments, the fields 72 and 74 are transmitted using a modulation scheme that allows any station operating in the network (such as the WLAN 10) to process at least these fields. According to an embodiment, the legacy portion of the data unit 70 occupies a 20 MHz band.

Further, in an embodiment, the data unit 70 has a VHT portion that includes a VHT signaling field VHT-SIGA 76, VHT training fields 78 (that includes, for example, a VHT-STF and/or VHT-LTF), a VHT signaling field VHT-SIGB 80, a service field 82, a VHT-AMPDU 84, a PHY pad 86, and a tail portion 88. Using spatial multiplexing or another suitable technique, the fields 82-88 with receiver-specific information are transmitted in parallel to several receivers. In another embodiment, the VHT-SIGB 80 also carries client-specific information, and accordingly is spatially multiplexed. For example, the VHT-SIGA 76 includes information common to all client stations (e.g., assignment of space-time streams) and the VHT-SIGB 80 includes information specific to a client station (e.g., modulation and coding rate).

Briefly, the VHT training fields 78 include training sequences to enable receivers to accurate estimate the MIMO channel, for example. The service field 82, in one embodiment, is used for scrambler initialization. In an embodiment, the format of the VHT-AMPDU 84 is similar to that of the AMPDU 60 discussed above with reference to FIG. 2B. It is noted that each VHT-AMPDU 84 carries information specific to a particular receiver via one or more spatial streams. Because the VHT-AMPDUs 84 transmitted to individual receivers need not be of the same length, the PHY pad portion 86 is added following the VHT-AMPDU 84 in each instance. In some cases, the length of the PHY pad portion 86 is zero bits.

In an embodiment, the VHT-SIGA 76 includes a stream indication field that includes group identity information, in at least some scenarios, and indicates whether the data unit 70 is transmitted in an MU mode or an SU mode and, if the data unit 70 is transmitted in an MU mode, specifies the MU group and a mapping of spatial streams to client stations within the MU group. Example formats of the stream indication field are discussed in more detail with reference to FIGS. 4A-C. It is noted that when stream indication field and the group identity information included therein indicate that the data unit 70 is transmitted in an SU mode, the transmitter of the data unit 70 need not specify the mapping of spatial streams to client stations other than a single receiver to which the data unit 70 is transmitted, in an embodiment. To enable a non-intended receiver of the data unit 70 transmitted in an SU mode to more quickly determine that the data unit 70 is transmitted to another network device, the transmitter uses at least some of the portions of the stream indication field allocated for spatial stream mapping to specify at least a partial identity of the intended receiver of the data unit 70, in an embodiment. Depending on the embodiment, the at least partial identity corresponds to a MAC address of the intended receiver, an association identity (AID) of the intended receiver, etc. In this manner, a part of the stream indication field included in VHT-SIGA 76 or another portion of the data unit 70 (e.g., the VHT-SIGB 80) can be used for receive filtering.

Figure 4A:
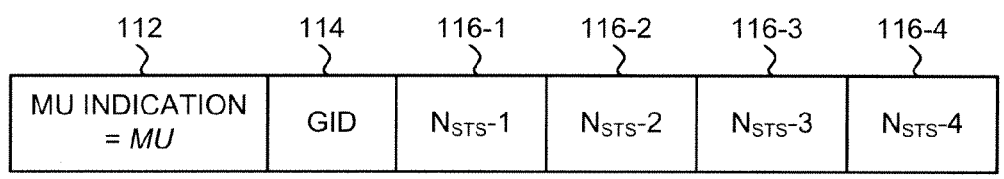
FIG. 4A is a diagram of stream indication field in which a multi-user (MU) indication sub-field indicates MU usage, according to an embodiment.
Figure 4B:
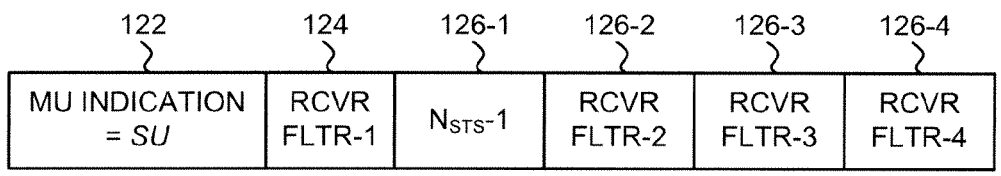
FIG. 4B is a diagram of stream indication field in which an MU indication sub-field indicates single user (SU) usage, and wherein the stream indication field includes receive filtering information, according to an embodiment.
Figure 4C:
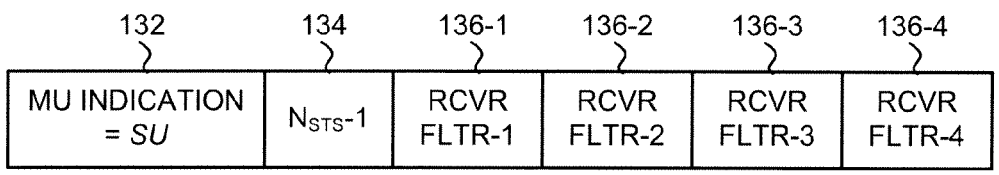
FIG. 4C is a diagram of stream indication field in which an MU indication sub-field indicates SU usage, and wherein the stream indication field includes receive filtering information, according to another embodiment.

To better explain the example formats of a stream indication field illustrated in FIGS. 4A-C, MU group formation and stream allocation techniques in a communication network are briefly considered next.

In an embodiment, a network device such as the AP 14 defines an MU group, i.e., a group of client stations to which at least one data frame is to be transmitted simultaneously, with a portion of the data frame carrying station-specific information via a respective set of spatial streams. When forming an MU group, the AP 14 considers one or more of the capability of each client station, the type of data to be transmitted to each client station, etc. In an embodiment, the AP 14 selects up to four client stations for participation in each group. In general, the number of client stations in a group is limited by the number of transmit antennas with which the AP 14 is equipped.

Next, in an embodiment, the AP 14 assigns a group identifier (group ID or simply GID) to the group and announces the group formation by including a group definition field in a management or control communication frame, for example. In an embodiment, the AP 14 includes a group definition field in a channel sounding communication frame. Further, in an embodiment, the AP 14 generates a communication frame that includes several group definition fields and a field that specifies the number of group definition fields included.

Figure 3:
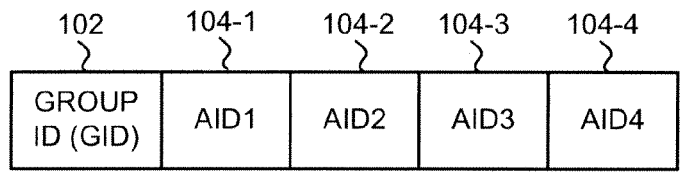
FIG. 3 is a diagram of a group definition field that is included in a communication frame transmitted in the system of FIG. 1, according to an embodiment.

FIG. 3 is a diagram of an example group definition field 100. In an embodiment, the group definition field 100 includes a GID subfield 102 and four association identifier (AID) subfields 104. In other embodiments, the group definition field 100 includes other numbers of AID subfields (2, 3, 5, 6, etc.) The group definition field 100 includes as many AID subfields 104 as there are MU-MIMO users assigned to a group identified by the group ID subfield 102 (i.e., an "MU group"). For example, as shown in FIG. 3, the AID subfields 104 include a first AID (AID1) subfield 104-1, a second AID (AID2) subfield 104-2, a third AID (AID3) subfield 104-3, and a fourth AID (AID4) subfield 104-4. Referring back to FIG. 1, the group definition field 100 in one embodiment is generated by the PHY unit 20. In another embodiment, at least one of the AID subfields 104, and/or information included therein, are generated at least in part by the MAC unit 18.

Each of the AID subfields 104 includes an AID of one of the client stations 25 that the AP 14 has assigned to the MU group identified by the group ID subfield 162. Each one of the client stations 25 is configured to receive the entire group definition field 100 and, after detecting its own AID within one of the AID subfields 104, determine that the particular client station 25 is a member of the MU group identified by the group ID subfield 102. Each client station 25 further determines, based on the placement of its own AID relative to the AIDs of the other client stations 25 in the AID subfields 104, the order in which the indication of its own number of spatial streams is transmitted in a stream indication field, briefly mentioned above and discussed in more detail with reference to FIGS. 4A-C, relative to the indications for the other client stations 25. In the event that the group definition field 100 does not include the AID of a particular client station 25, that client station 25 determines that it is not a member of the MU group identified by the group ID subfield 102 and, for example, monitors subsequent group definition fields within the same or a different sounding frame until the client station 25 determines an MU group to which it belongs, in an embodiment. Example techniques for indicating spatial or space-time streams in a communication systems, as well related techniques, are disclosed in a co-pending U.S. patent application Ser. No. 12/910,608, entitled "Number of Stream Indication for WLAN" and filed on Oct. 22, 2010, the entire disclosure of which is hereby incorporated by reference herein.

Referring to FIG. 4A, a network device that transmits a communication frame to an MU group having two or more client stations uses a stream indication field 110, according to an embodiment. In the example scenario to which FIG. 4A corresponds, the stream indication field 110 includes an MU indication subfield 112 set to "MU" to indicate that at least a portion of the communication frame including the stream indication field 110 is being sent in an MU mode. In an embodiment, the MU indication subfield 112 is one bit long. The stream indication field 110 further includes a GID subfield 114 to specify an MU group and several number of spatial or space-time streams subfields 116 to indicate which spatial or space-time streams have been allocated to particular client stations associated with the specified MU group. According to some embodiments, a certain predefined value in the GID subfield 114 indicates that the communication frame is being sent in an SU mode. In some of these embodiments, the stream indication field 110 does not include the MU indication subfield 112, or the bits of the MU indication subfield 112 are used to convey other information. In an embodiment, a receiver of the stream indication field 110 determines which of the subfields 116 pertains to the receiver based on a group definition field received previously in a management frame. For example, a receiver with an AID A receives a group definition field that specifies an MU group G and lists the AID A in the second position with a corresponding set of AID subfields (e.g., as the subfield 104-2 according to the format of FIG. 3). In response to receiving the stream indication field 110 in which the MU indication subfield 112 is set to "MU" and the GID subfield 114 is set to G, the receiver checks the subfield 116-2 to determine which spatial streams or space-time streams have been allocated to this receiver. A more detailed discussion of these techniques is included in the Ser. No. 12/910,608 application.

In an embodiment, each of the subfields 116 is three bits long to specify zero, one, two, three, four, five, six, or eight streams. In another embodiment, the stream indication field 110 is "compressed" by excluding certain scenarios not supported in a particular implementation of the WLAN. For example, in a certain embodiment, a limit of four streams to be used in receiving an MU communication frame is imposed on each client station, and the size of each subfield 116 accordingly is safely reduced to two bits. In another embodiment, each allowable mapping of streams to client stations (e.g., four streams to a first client station, two streams to the second client station, and one stream each to the third and fourth client stations) is listed in a look-up table, so that the subfields 116 can be combined into a single subfield that includes an index to the look-up table. Such formats of a stream indication field are referred to herein as "compressed formats."

Now referring to FIG. 4A, a network device such as the AP 14 transmits a communication frame to a particular client station in an SU mode, and uses a stream indication field 120 to provide receive filtering information to receivers. In an embodiment, the stream indication field 120 has the same format as the stream indication field 110 discussed above, except that one or more subfields are used differently in the SU mode. Accordingly, in an embodiment, a network device utilizes a format of a communication frame in which at least the portion of the communication frame that includes the stream indication field 110 or 120 is the same in SU and MU modes. For example, in an embodiment, the stream indication field 120 is included in a VHT-SIGA portion of a PHY preamble.

In the embodiment depicted in FIG. 4B, the MU indication subfield 122 of the stream indication field 120 is set to "SU" to indicate that the communication frame including the stream indication field 120 is being sent in an SU mode. The number of spatial or space-time streams subfield 126-1 indicates which spatial or space-time streams have been allocated to the single receiver of the communication frame. Some or all of the remaining sub-fields of the stream indication field 120 are used to provide receive filtering information, according to an embodiment. For example, in one embodiment, some or all of the fields 124, 126-2, 126-3, and 126-4 specify the least significant bits (LSBs) of a MAC address of an intended receiver of the communication frame or another indication generated from some or all of the address bits of the MAC address of the intended receiver (so as to avoid an overlap with similar indications of other receivers). In yet another embodiment, some or all of these fields specify the AID or a partial AID of the intended receiver of the communication frame. In yet another embodiment, some or all of these fields specify other information specific to an intended recipient.

In these embodiments, a client station receives the stream indication field 120, checks the MU indication subfield 122 to determine that the communication frame is transmitted in an SU mode, and uses the subfields other than the subfields 122 and 126-1 to determine whether the client station is an intended receiver of the communication frame. The client station advantageously stops processing the communication frame to save processing resources and/or power in response to determining that the client station is not an intended receiver of the communication frame, according to an embodiment. Otherwise, the client station continues to process the communication frame.

FIG. 4C is a diagram of stream indication field 130 that is generally similar to the stream indication field 120, except that bits in other positions within the stream indication field 130 are used for receive filtering. In this example embodiment, fields 136-1 through 136-4, used for identifying spatial or space-time streams in the format of FIG. 4A, are used to carry receive filtering information.

In general, a stream indication field for use in MU and SU modes can be formatted in any suitable manner that allows a transmitting device to specify whether the communication frame is transmitted in an MU or SU mode and further specify, in one case, the mapping of streams for each client station and, in the other case, receive filtering information. In this manner, the same field (or, at least, a field of the same size in the same position within a communication frame) can be used in both MU and SU modes of transmission. Further, in some embodiments, network devices use a compressed format of the stream indication field. In one such embodiment, for example, fewer bits are used for receive filtering relative to a non-compressed format.

In some embodiments, network devices use the techniques discussed above to implement advanced power saving strategies. For example, according to one embodiment, an AP or a client station uses the group definition field 100 to form a group of client stations that operate in a heavy-traffic mode (e.g., large file download). The AP or the client station then utilizes a stream indication field that conforms to the format 110 in a MU mode and the format 120 in an SU mode, for example, to efficiently control power consumption by other client stations that do not currently operate in the heavy-traffic mode.

Next, further receive filtering techniques are discussed with reference to FIGS. 5A-11.

Referring to FIG. 5A, a known RTS frame 150 is used to reserve a TxOP in some communication systems. The RTS frame 150 includes a frame control field 152, a duration field 154, a receiver address 156, a transmitter address 158, and an FCS 160. As indicate above with reference to FIG. 2A, a network device allocates a TxOP for transmission of one or more communication frames to one or more receiving devices. In an embodiment, the known RTS frame 150 conforms to the format defined by the legacy 802.11 protocols.

To enable network devices to operate more efficiently (e.g., save power and/or other resources), an RTS frame 170 in an embodiment illustrated in FIG. 5B of the present disclosure includes an exclusive use indicator 172 to indicate whether the NAV (network allocation vector) period (such as a TxOP) to which the RTS frame 170 pertains is being reserved exclusively for transmitting information to a device identified in the receiver address field 178 or, in another scenario, to a group identified in the PHY preamble using a stream indication field discussed above, for example. In an embodiment, the duration of the NAV period associated with the exclusive use indicator 172 is indicated in a duration field 176. Further, in an embodiment, the exclusive use indicator 172 is implemented as a single-bit flag included in an FCS frame control field 174. In other embodiments, however, the exclusive use indicator 172 is included in another suitable location within a PHY preamble, a PHY header, a MAC header, etc., for example.

In an example scenario, a network device receives the RTS 170 in which the exclusive use indicator 172 is set to "true" and, in response to detecting a CTS communication frame responsive to the RTS 170 (see FIG. 2A, for example), determines that the transmitter of the RTS 170 has successfully allocated the corresponding TxOP (with the duration specified in the field 176, for example) for exclusive transmissions to a receiver identified in the field 178. If the receiver identified in the field 178 is not the network device, the network device determines that no processing of incoming communication frames is necessary for the entire duration of the TxOP associated with the RTS 170, according to an embodiment. The network device then powers down the communication circuitry or the entire device, for example, depending on the embodiment. If, however, the exclusive use indicator 172 is set to "false," the network device will typically decide to check every incoming communication frame transmitted during the TxOP to see whether the network device is an intended receiver of the communication frame.

Figure 6:
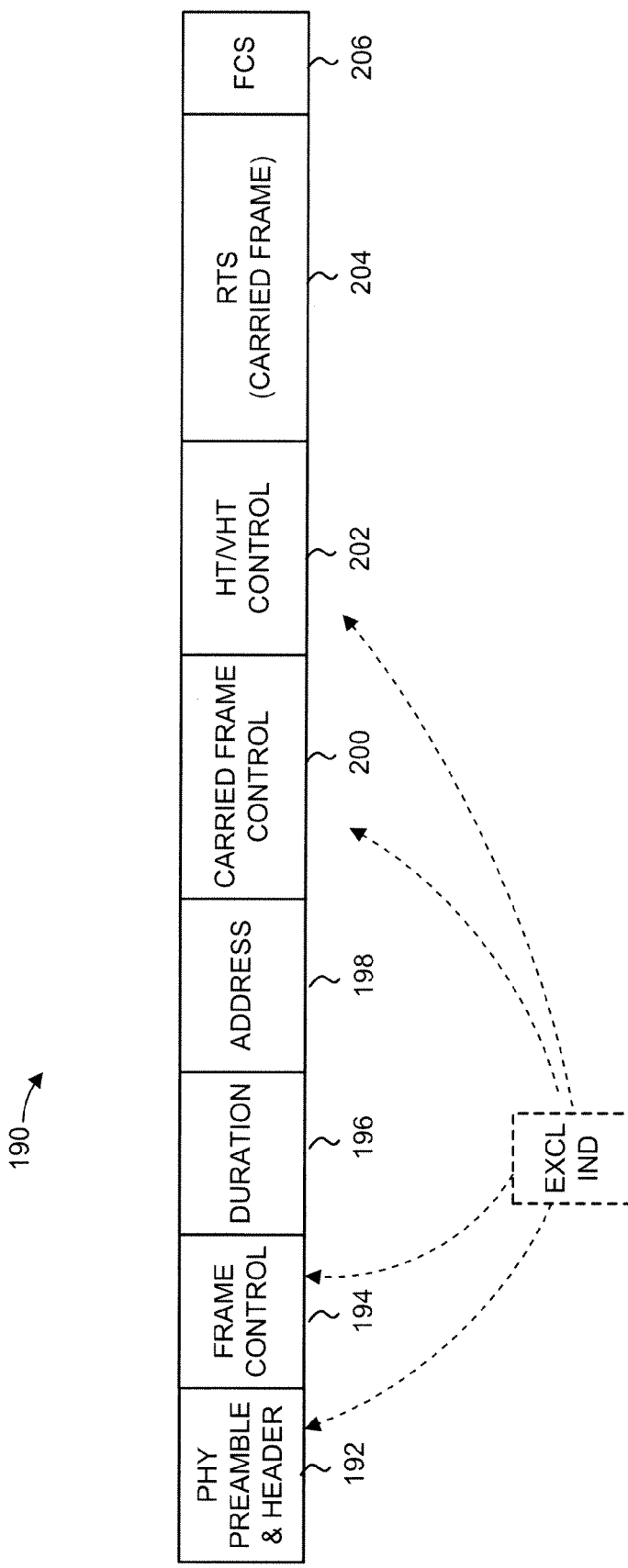
FIG. 6 is a diagram of a control wrapper frame that includes an RTS frame, according to an embodiment.

Now referring to FIG. 6, in another embodiment, an RTS that conforms to the known format illustrated in FIGS. 5A and 5B is "wrapped" in a control wrapper frame 190 that includes an exclusive use indicator. In an embodiment, the control wrapper frame 190 includes a PHY preamble and header portion 192, a frame control field 194, a duration field 196, an address field 198, a carried frame control field 200, an HT/VHT control field 202, and carried frame portion 204 to contain the RTS, and the FCS 206. In various embodiments, an exclusive use indicator is included in one or more of the fields 192, 194, 200, or 202. For example, an exclusive use indicator implemented as a one-bit flag is included in the VHT control field in the MAC header, in an embodiment. Further, the VHT control field of the control wrapper frame 190 in certain embodiments also includes an indicator of an MU group for which the TxOP associated with the "wrapped" RTS is being reserved. Similar to the embodiments discussed above, the control wrapper frame 190 can be used to allocate a TxOP for an exclusive use by one or several preceding devices, thereby allowing other devices to efficiently and accurately implement receive filtering.

FIG. 7A is a diagram of an example HT/VHT control field 220 with an exclusive use indication that can be included in the control wrapper frame 190 of FIG. 6, for example. The HTNHT control field 220 is generally similar to the HT control field specified by the IEEE 802.11n standard, except that one or several reserved bits of the field 220, or "useless" bits of the field 220 (e.g., bits that carry meaningful information for HT stations but do not carry meaningful information for VHT stations) are used as an exclusive use indication 222A or 222B.

In another embodiment illustrated in FIG. 7B, an HTNHT control field 230 includes a group identifier to specify an MU group to which the corresponding TxOP is being allocated. The group identifier in this embodiment is distributed between fields 232 and 234, with the most significant bits (MSB) of the group identifier stored in the field 232, and the least significant bits (LSB) of the group identifier stored in the fields to 234. Further, in an embodiment, a control wrapper frame includes both an exclusive use indication and a group identifier.

In some embodiments, a CTS frame includes an exclusive use indication instead of, or in addition to, an exclusive use indication included in the corresponding RTS frame. FIG. 8A illustrates a CTS 250 that conforms to a known format. The CTS 250 includes a frame control field 252, a duration field 254, a receiver address field 256, and an FCS 258. On the other hand, in an embodiment, a CTS frame 260 illustrated in FIG. 8B includes a frame control field 262 having an exclusive use indication 264. Also, in the embodiment, a CTS frame 250 or 260 can be wrapped in a control wrapper frame similar to the RTS frame discussed above.

More generally, using the techniques identical or similar to those discussed above, an exclusive NAV allocation mechanism is implemented. A certain NAV period in various embodiments corresponds to a transmission/response exchange in an SU mode or an MU mode, a sequence of two or more such transmission/response exchanges, a TxOP period, a PSMP period, etc. Depending on the embodiment, a network device specifies the duration of a NAV period for transmission of data to one particular network device or a particular group of network devices in a MAC header, a delimiter (such as the delimiter 62 in FIG. 2B), a service field (such as the service field 82 in FIG. 2C), the PHY preamble, etc. The network device signals exclusive use of the NAV period in these or other portions of the communication frame that specifies the NAV duration, in some embodiments.

In another embodiment, the exclusive use of an allocated NAV period is determined by a network device that receives a communication frame specifying the duration of the NAV period. For example, in response to receiving a communication frame specifying a NAV allocation, a network device in one embodiment generates an acknowledgment frame (ACK) that includes an exclusive use indication for the NAV period. The NAV period is then reserved for the exclusive use by the transmitter of the ACK, in one such embodiment. In another embodiment, a network device receives a communication frame including NAV allocation and responds with an exclusive use indication as well as a GID of an MU group to which the NAV period should be allocated. In some or all of these embodiments, a client station that receives a communication frame that indicates that a certain NAV period is being reserved for exclusive use by a certain receiver or a group of receivers that excludes the client station, powers down completely or partially (e.g., temporarily disables the RE circuitry) so as to save power, for example.

Next, receive filtering techniques directed to eliminating "false positives" as well as "false negatives" in identifying intended recipients of communication frames are considered. In particular, a network device in a certain scenario erroneously identifies an unintended communication frame as an intended communication frame, while in another scenario, the network device identifies an intended communication frame as an unintended communication frame. As discussed in more detail below, verifying the correctness of a processed receiver identity sometimes requires processing an entire communication frame or a substantial portion of the communication frame prior to reaching relevant (e.g., CRC, parity) information.

Figure 9A:
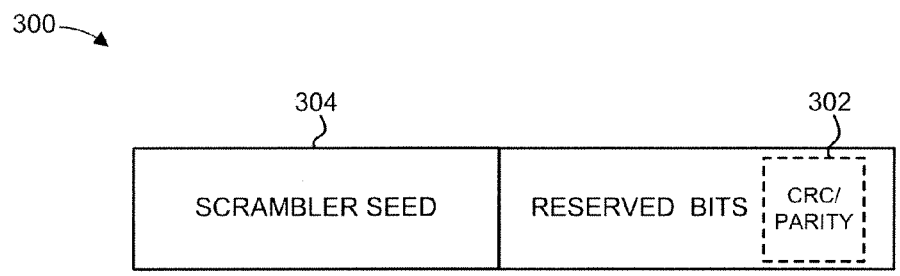
FIG. 9A is a diagram of a service field that includes cyclic redundancy check (CRC) or parity bits, according to an embodiment.

Referring to FIG. 9A, a service field 300 includes verification bits (e.g., cyclic redundancy check, parity) 302 so that a receiving device can check whether a scrambler seed 304 also included in the service field 300 is correct, according to an embodiment. In some embodiments, the verification bits 302 also are used to check the correctness of other fields or subfields that precede the scrambler seed 304, e.g., VHT-SIGB, L-SIG, etc. Referring back to FIG. 2C, for example, the service field 82 in at least some of the embodiments includes a scrambler seed necessary for processing the VHT-AMPDU 84. Thus, if the service field 82 includes incorrect information, none of the subframes of the AMPDU 84 can be processed correctly. In an embodiment, a transmitting device utilizes the service field 300 having the verification bits 302 as the service field 82, so that a receiving device can check the correctness of the scrambler seed immediately upon receiving the entire service field 300. If the receiving device determines that the scrambler seed in the service field 300 is incorrect, the receiving device does not process the AMPDU 84, thereby saving resources such as power.

Figure 9B:
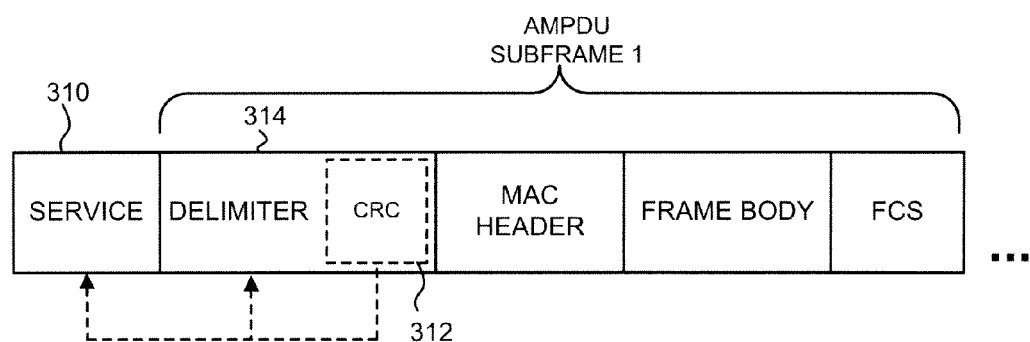
FIG. 9B is a diagram of a portion of a communication frame in which the service field is checked by a delimiter of a first AMPDU subframe, according to an embodiment.

In another embodiment illustrated in FIG. 9B, a service field 310 is checked by an CRC indicator 312 in a delimiter 314 of a first AMPDU subframe, according to an embodiment. In this embodiment, a receiving device processes the delimiter 314 in addition to the service field 310 prior to checking the correctness of the service field 310. Further, in some embodiments, the CRC indicator 312 also is used to check the correctness of other fields or subfields that precede the service field 310.

Figure 9C:
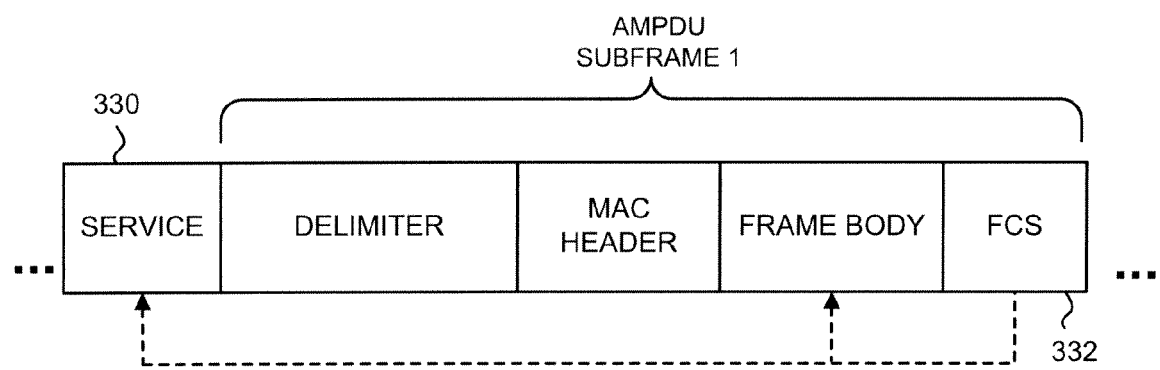
FIG. 9C is a diagram of a portion of a communication frame in which the service field is checked by the frame check sequence (FCS) field of the first AMPDU subframe, according to an embodiment.

Referring to FIG. 9C, a service field 330 in this embodiment is checked by an FCS 332 of the first AMPDU subframe. Thus, a receiving device in this case processes the first AMPDU subframe in addition to the service field 330 prior checking the correctness of the service field 330. In another embodiment, the service field 330 is protected by the FCS of the entire AMPDU field. Further, in some embodiments, the FCS 332 also is used to check the correctness of other fields or subfields that precede the service field 330.

Figure 9D:
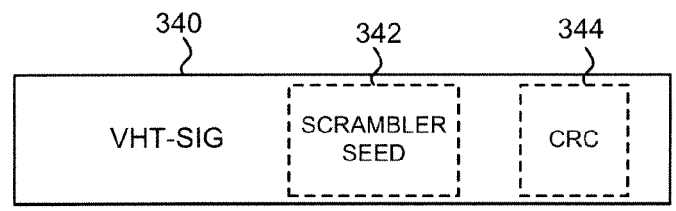
FIG. 9D is a diagram of a very high throughput (VHT) signaling (SIG) field of a physical layer (PHY) preamble that includes a scrambler seed, according to an embodiment.

In another embodiment illustrated in FIG. 9D, a VHT-SIG portion 340 of a PHY preamble includes a scrambler seed 342 and CRC bits 344 to verify the correctness of the VHT-SIG portion 340, including the scrambler seed 342. According to this embodiment, the correctness of the CRC can be detected relatively early and, when an error is detected, a receiving device need not process the rest of the communication frame. Further, in some embodiments, the CRC bits 344 also are used to check the correctness of other fields or subfields that precede the VHT-SIG portion 340.

Figure 10A:
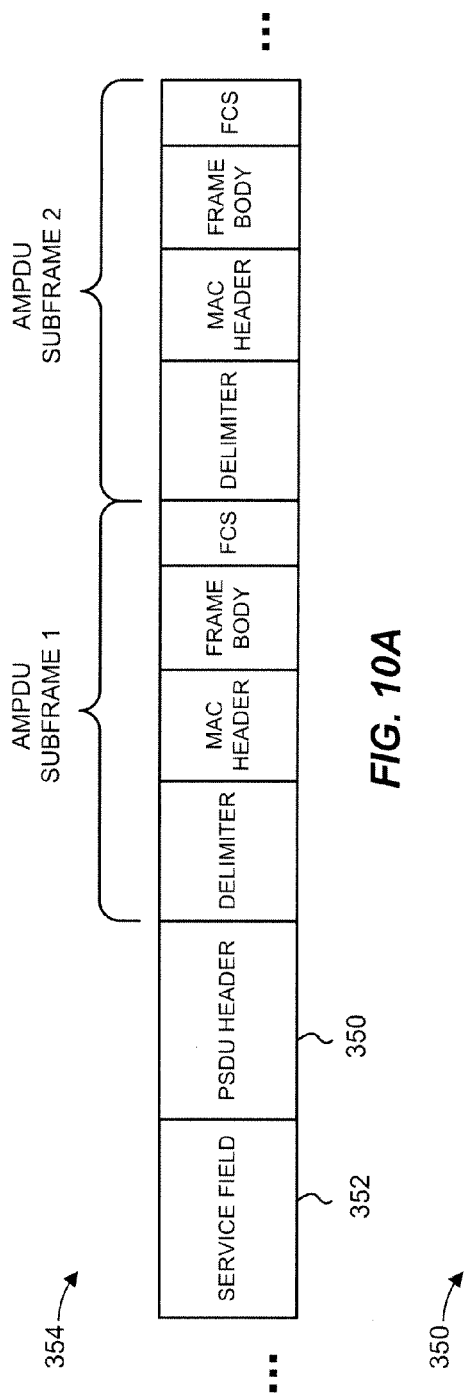
FIG. 10A is a diagram of a portion of a communication frame, wherein the PSDU header includes a PHY Service Data Unit (PSDU) header that includes information that can be used for receive filtering, according to an embodiment.
Figure 10B:
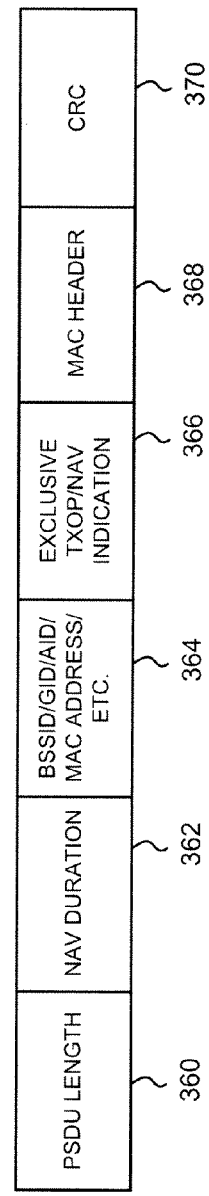
FIG. 10B is a diagram of a PSDU header, according to an embodiment.

In some embodiments, as illustrated in FIG. 10A, a PHY Service Data Unit (PSDU) header 350 is generated and included in a communication frame 354 following a service field 352 and before the first AMPDU subframe in the communication frame 354. An example format of the PSDU header 350 is depicted in FIG. 10B. In an embodiment, the PSDU header 350 includes a length field 360, a NAV duration field 362, an identifier field 364 (e.g., BSSID, GID, AID, MAC Address, etc. relating to a destination device or a destination group), an exclusive use indication 366, a MAC header 368, and a CRC field 370. In other embodiments, however, a PSDU header includes only some of the fields of the PSDU header 350.

A network device that receives a communication frame including the PSDU header 350 uses the PSDU length field 360 to determine the end of the portion that includes useful data and the pad bits, for example. For example, a network device determines that the PSDU does not include any data transmitted to the network device based on the identifier field 364, verifies the correctness of the PSDU header 350 using the CRC field 370 and, in response to determining that the PSDU header 350 has been correctly processed, determines a sleep period (or a period during which the network device need not process incoming data) based on the value of the PSDU length field 360. For example, in an embodiment, the PSDU length field 360 specifies the length of the entire AMPDU included in the communication frame, so that a receiver of the communication frame can determine whether the receiver can sleep for the duration of the AMPDU using the identifier field 364 (and, in at least some of the embodiments, the corresponding CRC field 370).

Similar to some of the embodiments discussed above, the NAV duration field 362 specifies the duration of a NAV period, and the exclusive use indication 366 indicates whether the NAV period is being used exclusively for transmitting data to the one or more network devices identified in the identifier field 364, so that receivers of the communication frame can perform receive filtering, when appropriate.

In an embodiment, the CRC field 370 covers both the PSDU header 350 and the service field 352 that immediately precedes the PSDU header 350. Further, in an embodiment, the service field 352 and the PSDU header 350 are transmitted using a relatively low modulation mode (e.g., BPSK). In another embodiment, the PSDU header 350 additionally operates as a delimiter of the first AMPDU subframe that immediately follows the PSDU header 350. On the other hand, in a different embodiment, the PSDU header 350 is a special AMPDU sub-frame having a delimiter and a special-purpose MPDU. In yet another embodiment, the PSDU header 350 is an extension of the service field 352.

Figure 11:
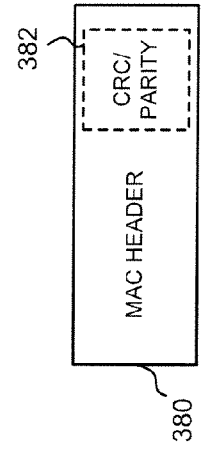
FIG. 11 is a diagram of a MAC header that includes CRC or parity bits, according to an embodiment.

Referring to FIG. 11, a MAC header 380 includes verification bits 382 (e.g., CRC, parity). For example, one or several CRC or parity bits are added to the HT/VHT control field included at the end of the MAC header 380, according to an embodiment. In an embodiment, a network device receives a communication frame and uses the verification bits 382 to verify the correctness of the MAC header 380 (including the destination address). The verification bits 382 in some embodiments also are used to verify the correctness of other fields that precede the MAC header 380, e.g., a service field, a VHT signal field. In this manner, the network can reliably implement receive filtering (e.g., not process the rest of the communication frame upon determining that the destination address in the MAC header 380 specifies another device).

Figure 12:
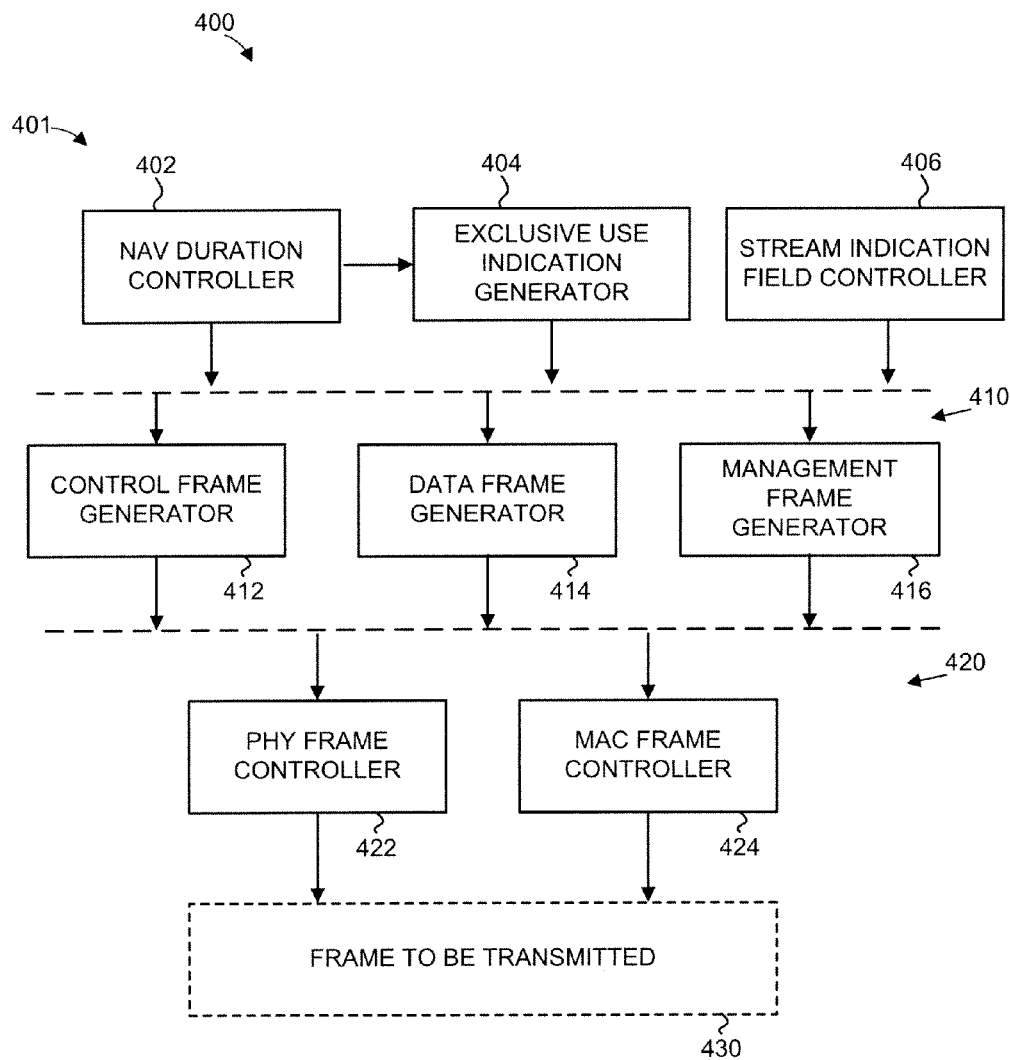
FIG. 12 is a diagram of a transmitter that generates communication frames that include receive filtering information, according to an embodiment.

Next, FIG. 12 illustrates an example transmitter 400 that implements at least some of the techniques discussed above to generate receive filtering information to be included in a communication frame. In various embodiments, the transmitter 400 includes only some of the components depicted in FIG. 12.

In an embodiment, the transmitter 400 includes a receive filtering generation module 401 including a NAV period controller 402, configured to determine the duration of a NAV period, and an exclusive use indication generator 404 coupled to the NAV period controller 402 to determine whether a certain NAV period should be allocated for transmitting one or more communication frames only to a specific network device or an identifiable group of network device (e.g., associated with a particular GID). Further, in an embodiment, the receive filtering generation module 401 includes a stream indication field controller 406 configured to selectively generate a stream indication field according to the format 110 or 120, for example (see FIGS. 4A and 4B, respectively).

In various embodiments, the receive filtering generation module 401 is coupled to a frame generation module 410 including one or more of a control frame generator 412, a data frame generator 414, and a management frame generator 416. Accordingly, depending on the embodiment, one or more of a NAV allocation information (e.g., duration), an exclusive use indication, and a stream indication field are included in one or more of a control frame, a data frame, or a management frame. Further, in an embodiment, the frame generation module 410 includes a control wrapper frame controller (not shown) to wrap certain communication frames (e.g., RTS, CTS) so that a wrapped communication frame includes receive filtering information.

With continued reference to FIG. 12, in an embodiment, the transmitter 400 further includes a frame formatting module 420 having a PHY frame controller 422 and a MAC frame controller 424. The components 422 and 424 are configured to generate preamble, header, and payload portions associated with the PHY layer and the MAC layer, respectively, to generate a communication frame 430 for transmission via a wireless communication channel.

Referring back to FIG. 1, in an embodiment, at least some of the components of the transmitter 400 are included in a receive filtering Tx controller 19. For example, a receive filtering Tx controller in an embodiment includes the receive filtering generation module 401. In another embodiment, a receive filtering Tx controller includes the receive filtering generation module 401 and the frame generation module 410. Further, in some embodiments, the MAC unit 18 also includes the MAC frame controller 424 and/or one or more of the components 412-416. In some embodiments, the PHY unit 20 includes the PHY frame controller 422.

Figure 13:
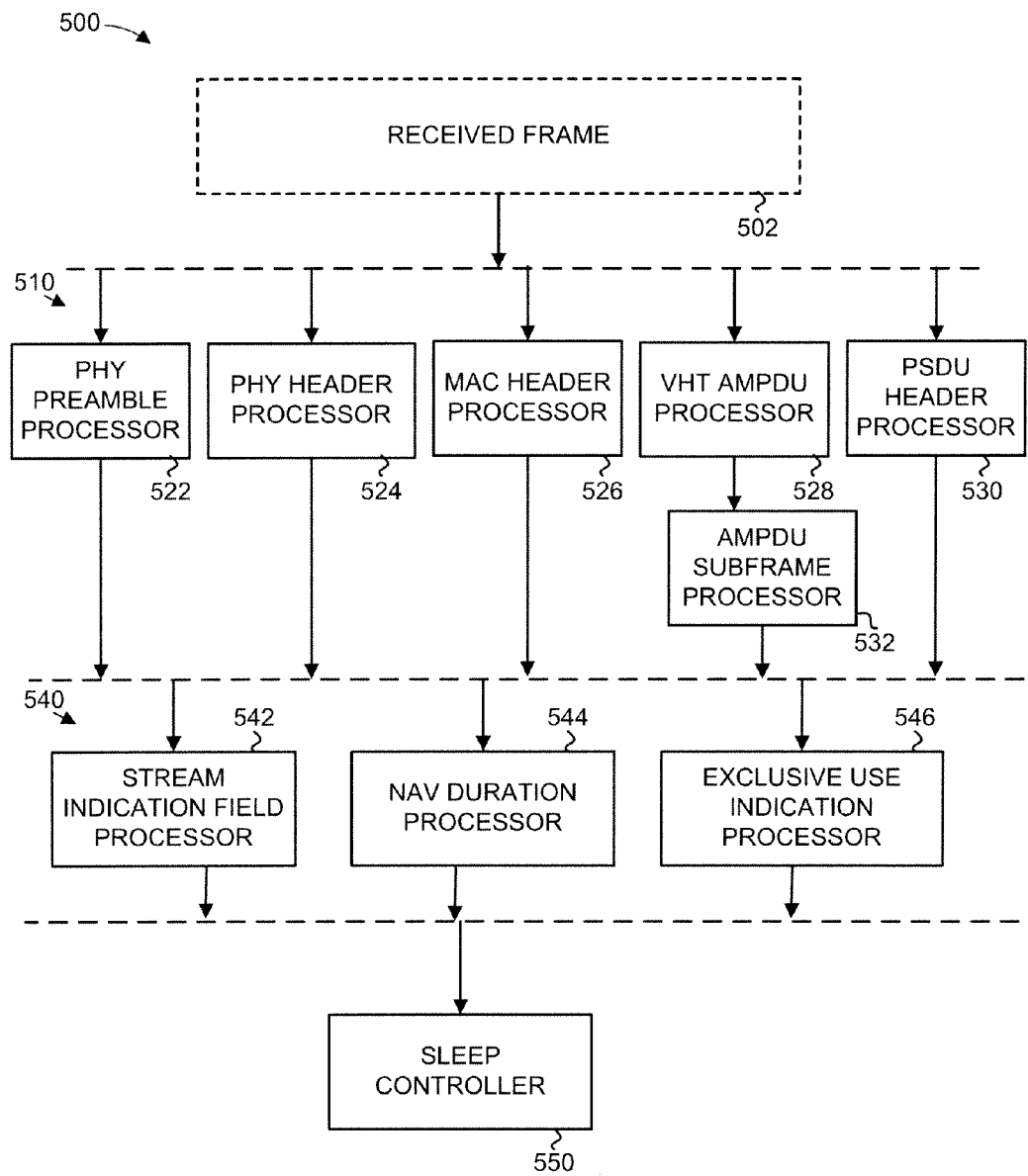
FIG. 13 is a diagram of a receiver that processes communication frames that include receive filtering information, according to an embodiment.

FIG. 13 illustrates an example receiver 500 that processes an incoming communication frame and processes receive filtering information included therein, when appropriate. In an embodiment, the receiver 500 includes a communication frame processor (or a "data unit processor") 510 including a PHY preamble processor 522, a PHY header processor 524, a MAC header processor 526, a VHT AMPDU processor 528, and a PSDU header processor 530. Further, in an embodiment, the VHT AMPDU processor 528 is coupled to an AMPDU subframe processor 532. In various embodiments, the components 522-532 operate to process respective portions of a communication frame and supply information relevant to receive filtering to a receive filtering processing module 540.

In an embodiment, the receive filtering processing module 540 includes a stream indication processor 542 to process a stream indication field according to the format 110 or 120, for example (see FIGS. 4A and 4B, respectively). The receive filtering processing module 540 further includes a NAV duration processor 544 to determine the duration of an allocated NAV period, and an exclusive use indication processor 546 to determine whether a certain NAV period has been allocated for transmitting one or more communication frames only to a specific network device or an identifiable group of network device (e.g., associated with a particular GID, according to an embodiment.

The filtering processing module 540 is coupled to a sleep controller 550, in an embodiment. Based on the information provided by one or more of the components 542-546, the sleep controller 550 determines an interval during which the receiver 500 can safely not listen to incoming communication frames. Referring back to FIG. 1, in an embodiment, at least some of the components of the receiver 400 can be included in a receive filtering Rx controller 33. For example, a receive filtering Rx controller in an embodiment includes the receive filtering processing module 540. In another embodiment, a receive filtering Rx controller includes the receive filtering processing module 540 and the sleep controller 550. Further, in some embodiments, the MAC unit 28 also includes one or more components 526-532. In some embodiments, the PHY unit 39 includes the component 522 and/or the component 524.

Several example methods that are implemented in the transmitter 400 or the receiver 500, in some embodiments, are discussed next with reference to FIGS. 14-17.

Figure 14:
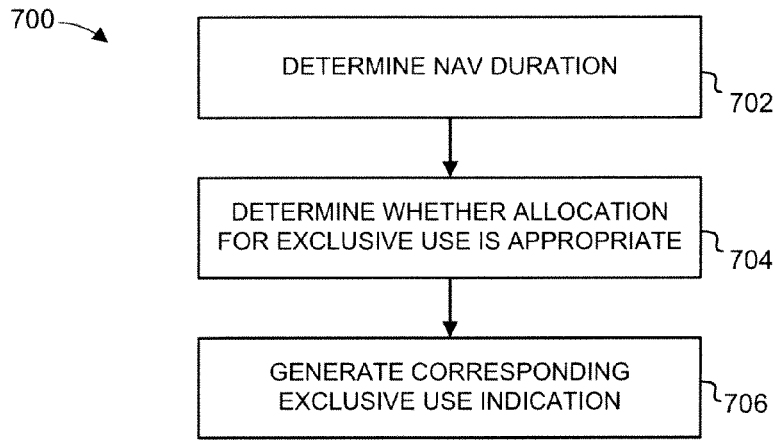
FIG. 14 is a flow diagram of an example method for generating a communication frame that includes an exclusive use indication, according to an embodiment.

FIG. 14 is a flow diagram of an example method 700 for generating a communication frame that includes an exclusive use indication. At block 702, the duration of a NAV period (e.g., a TxOP, a sequence of data frames, etc.) is determined. Next, at block 704, it is determined whether the NAV period should be allocated for transmission only to a particular network device or an identifiable group of network devices, and an appropriate indication (e.g., "exclusive use," "non-exclusive use") is generated at block 706. In an embodiment, the method 700 is at least partially implemented in the transmitter 400 (e.g., in the components 402 and 404).

Figure 15:
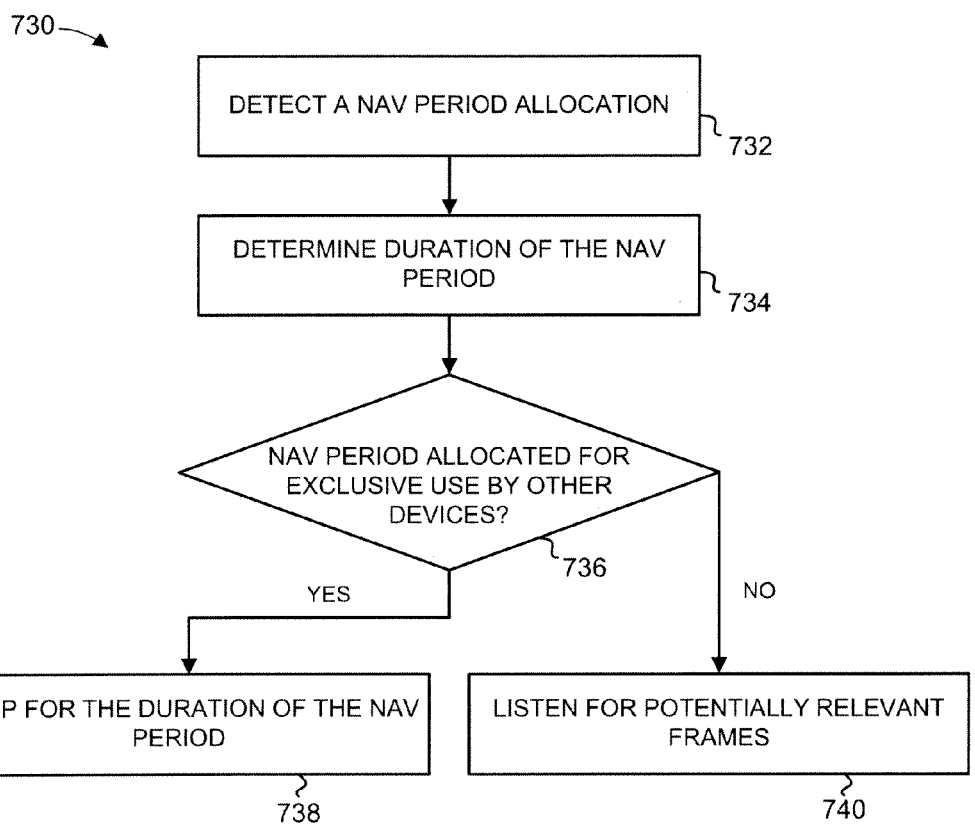
FIG. 15 is a flow diagram of an example method for determining the permissible sleep interval using an exclusive use indication included in a communication frame, according to an embodiment.

Referring to FIG. 15, an example method 730 for determining the permissible sleep interval is at least partially implemented in the receiver 500 (e.g., in the components 544, 546, and 500). At block 732, a NAV period allocation is detected in a received communication frame. For example, a received communication frame is recognized as an RTS frame such as the RTS frame 170 depicted in FIG. 5B. At block 734, the duration field of the allocated NAV period is determined. To continue with this example, the duration field 176 of the RTS frame 170 is processed. Next, at block 736, another field in the PHY preamble, PHY header, MAC header, or elsewhere in the received communication frame is checked to determine whether the NAV period is allocated so that communication frames, such as data frames, will be transmitted only to a specified receiver or a group of receivers. In the example above, the exclusive use indicator 172 is checked. It is further determined at block 736 whether the one or more receivers to which communication frames will be transmitted during the reserved NAV period includes the network device in which the method 730 is being executed.

If it is determined that the NAV period has been allocated for exclusive use by other devices, at least a portion of the receiver is put to sleep at block 738. In other embodiments, block 738 includes other receive filtering and/or power saving decisions. Otherwise, at block 740, the receiver listens for potentially relevant incoming communication frames is made. In general, a communication frame can be transmitted to the network device at any time during a TxOP that has not been reserved for exclusive use. Accordingly, the network device needs to wake up to process at least a portion of each frame transmitted during the TxOP.

Figure 16:
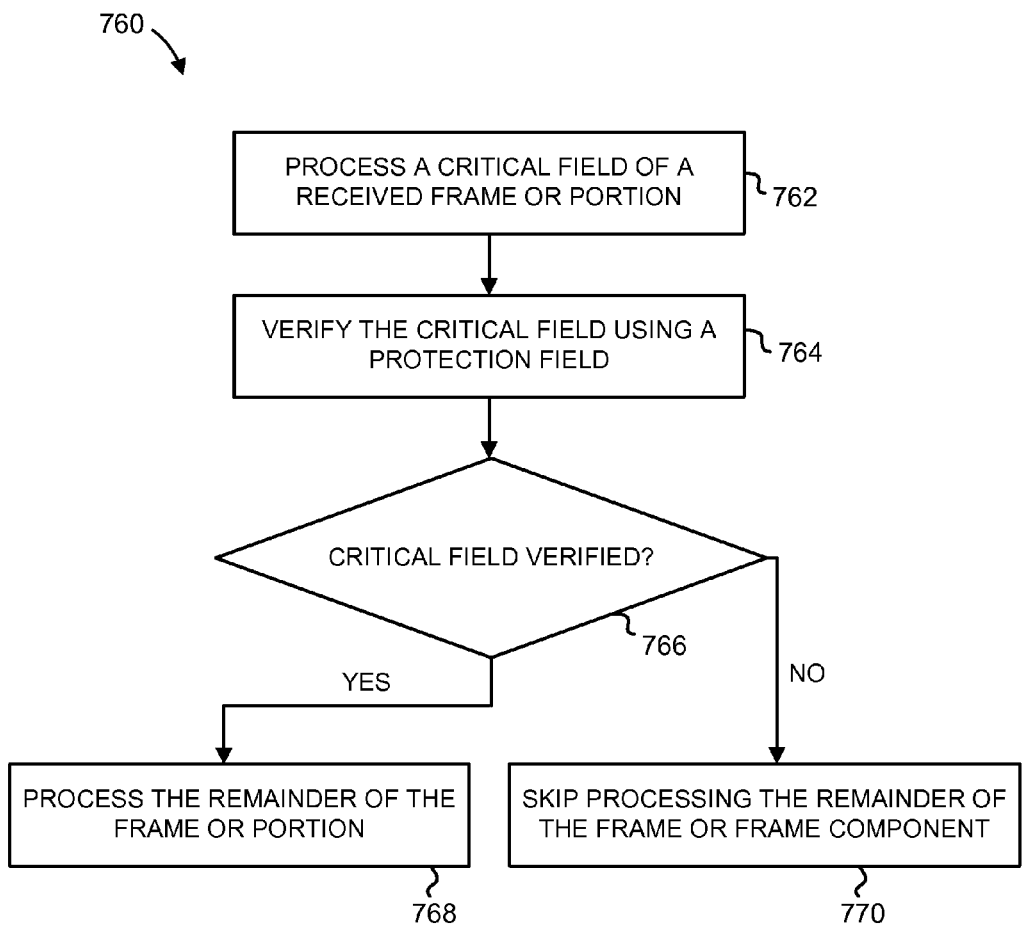
FIG. 16 is a flow diagram of an example method for receive filtering based on a determination of whether a communication frame or a portion of the communication frame can be properly received, according to an embodiment.

FIG. 16 is a flow diagram of example method 760 for receive filtering based on an efficient and accurate determination of an error in a field of a communication frame that prevents the receiver from processing the communication frame correctly. At block 762, a "critical" field of a communication frame is detected and processed and, at block 764, another field which may be referred to as "the protection field" is used to verify the integrity (e.g., correctness) of the critical field. In various embodiments, a critical field includes information that can be used for receive filtering (e.g., determining the intended destination of a communication frame, processing the remainder of the communication frame, etc.). For example, the critical field in one embodiment is a scrambler seed subfield of a service field, and the corresponding protection field is a set of CRC or parity bits included in the service field or in another field such as the delimiter. In another example embodiment, the critical field is the destination address in the MAC header, and the corresponding protection field is a set of CRC or parity bits included in the MAC header, for example. In yet another embodiment, the critical field is a portion of a PSDU header that includes one or more of NAV period allocation information, exclusive use indication, partial or full MAC header information, etc., and the corresponding protection field is a set of CRC or parity bits included in the PSDU header.

At block 766, the integrity of the critical field is verified using the protection field. If the critical field is verified, the remainder of the communication frame or a portion thereof (e.g., a VHT-AMPDU) is processed at block 768. Otherwise, at block 770, the remainder of the communication frame is skipped so that the network device in which the method 760 is being executed can save power and/or other resources.

In an embodiment, the method 760 is at least partially implemented by one or more of the PHY header processor 524, the MAC header processor 526, and the PSDU header processor 530.

Figure 17:
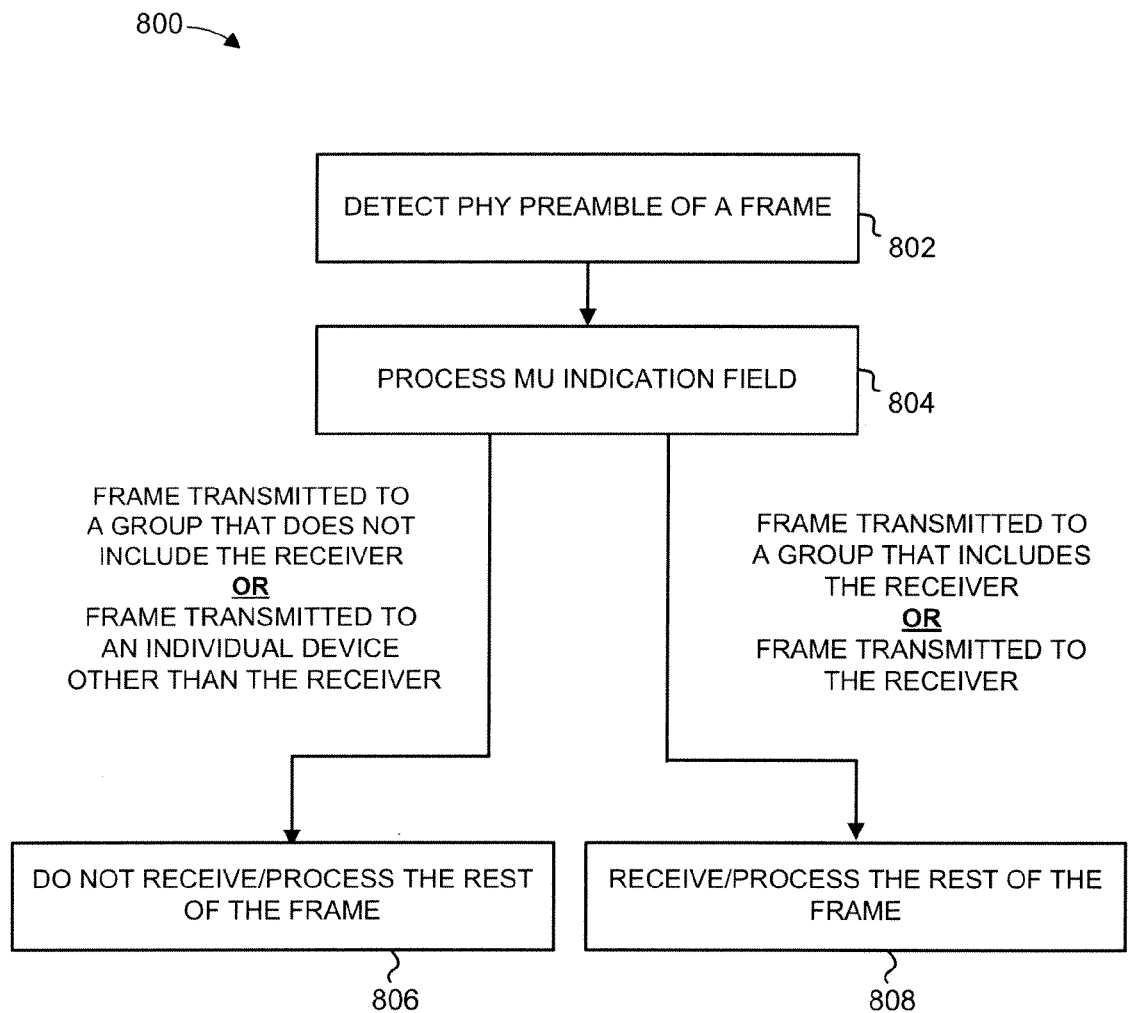
FIG. 17 is a flow diagram of an example method for determining a permissible sleep interval using an indication included in the PHY preamble of a communication frame, according to an embodiment.

FIG. 17 is a flow diagram of another example method 800 for determining a permissible sleep interval. At block 802, the PHY preamble of an incoming communication frame is detected. An MU indication, such as the MU indication field 112 or 122 in a stream indication field 110 or 120, respectively, is processed at block 804. If it is determined that the communication frame is transmitted to a group of network devices that does not include the receiver of the communication frame, or that the communication frame is transmitted to an individual device other than the receiver, the receiver does not process the rest of the communication frame (block 806), according to an embodiment. However, if it is determined that the communication frame is transmitted to a group of network devices that includes the receiver of the communication frame, or that the communication frame is transmitted specifically to the receiver, the receiver processes the rest of the communication frame (block 808). In an embodiment, the determination at block 804 is made using the GID included a stream indication field 110 if the MU indication specifies an MU mode, or using the receive filtering information in the indication field 110 if the MU indication specifies an SU mode.

In an embodiment, a method in a communication device includes receiving a PHY preamble of a data unit that includes a field having (i) a first sub-field to indicate whether the data unit is associated with MU transmission and, according to a first format, also having (ii) a second sub-field to indicate an identity of a group to which a plurality of receiving devices belong and (iii) a third sub-field to specify respective numbers of streams allocated to each of the plurality of receiving devices associated with the group; determining whether the data unit is associated with MU transmission based on the first sub-field; and, in response to determining that that the data unit is not associated with MU transmission, processing the data unit according to a second format, where the field includes an indication of whether the communication device should process the data unit. In one of the implementations of the second format, the field includes an indicator of a receiving device, so that the communication device determines that the data unit should be processed if the indicator corresponds to an identity of the communication device. In one such embodiment, the bits used to communicate the indicator of the receiving device correspond to the bits occupied by at least some of the portions of the second sub-field and the third-sub-field in the first format. Further, in one of the implementations of the first format, the second sub-field is a four-bit field, and the third sub-field includes four indicators, each for specifying streams for a respective one of the plurality of receiving devices. Each indicator is a four-bit field, in an example embodiment.

In another embodiment, a method in a communication device includes allocating a time period for transmitting a plurality of communication frames to one or more receiving devices, generating an indication that information will be transmitted to only the one or more receiving devices during the allocated time period, and including the indication in a communication frame to be transmitted via a wireless communication channel.

In yet another embodiment, a method in a communication device includes processing a critical field of a received data unit, such that the received data unit is processed using the critical field, processing a verification field of the received data unit to verify critical field and, if the critical field is not verified, not processing the received data unit. In another embodiment, a method in a communication device includes processing a critical field of a received data unit, such that the received data unit can be filtered using the critical field, processing a verification field of the received data unit to verify the critical and, if the critical field is verified, determining whether the received data unit needs to be processed.

At least some of the various blocks, operations, and techniques described above may be implemented utilizing hardware, a processor executing firmware instructions, a processor executing software instructions, or any combination thereof.

When implemented utilizing a processor executing software or firmware instructions, the software or firmware instructions can be stored in any computer readable memory such as on a magnetic disk, an optical disk, or other storage medium, in a RAM or ROM or flash memory, processor, hard disk drive, optical disk drive, tape drive, etc. Likewise, the software or firmware instructions can be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions can be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions can include machine readable instructions that, when executed by the processor, cause the processor to perform various acts.

When implemented in hardware, the hardware can comprise one or more of discrete components, an integrated circuit, an ASIC, a field-programmable gate array (FPGA), etc.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this disclosure, which would still fall within the scope of the claims.

What is claimed is:

1. A method for generating a data unit for transmission via a multiple input, multiple output (MIMO) communication channel, the method comprising:
   generating, at a communication device, a plurality of training sequences to be included in a preamble of the data unit;
   when the data unit is to be transmitted in a single user mode in which the data unit is intended for a single receiver,
      generating, at the communication device, a first field of the preamble to include an indicator that the data unit is being transmitted in the single user mode,
      generating, at the communication device, a second field of the preamble to include bits of an identifier of the single receiver, and
      generating, at the communication device, a third field of the preamble to include one or more bits set to a value that indicates a number of spatial or space time streams corresponding to the data unit;
   when the data unit is being transmitted in a multi-user mode in which the data unit is intended for multiple receivers,
      generating, at the communication device, the first field of the preamble to include an indicator that the data unit is being transmitted in the multi-user mode, and
      generating, at the communication device, the second field of the preamble to include one or more indications of one or more numbers of spatial or space time streams, wherein the one or more indications of one or more numbers of spatial or space time streams correspond to transmission of the data unit to one or more receivers among the multiple receivers, and wherein bits used in the multi-user mode for the one or more indications of one or more numbers of spatial or space time streams correspond to at least some of bits used in the single user mode for the identifier of the single receiver, and
      generating, at the communication device, the third field of the preamble to include the one or more bits set to a value that indicates a number of spatial or space time streams corresponding to a first receiver among the multiple receivers;
   generating, at the communication device, the preamble; and
   generating, at the communication device, the data unit to include the preamble.

2. The method of claim 1, wherein:
   the one or more indications of one or more numbers of spatial or space time streams correspond to transmission of the data unit to one or more second receivers among the multiple receivers, wherein the one or more second receivers among the multiple receivers correspond to one or more receivers, among the multiple receivers, other than the first receiver among the multiple receivers.

3. The method of claim 1, wherein generating the second field of the preamble to include bits of the identifier of the single receiver comprises generating the second field of the preamble to include only a subset of bits of the identifier of the single receiver.

4. The method of claim 1, wherein generating the second field of the preamble to include bits of the identifier of the single receiver comprises generating the second field of the preamble to include bits of an association identifier (AID) of the single receiver.

5. An apparatus, comprising:
   a physical layer (PHY) processing device having one or more integrated circuits configured to:
   generate a plurality of training sequences to be included in a preamble of a data unit to be transmitted via a multiple input, multiple output (MIMO) communication channel,
   when the data unit is to be transmitted in a single user mode in which the data unit is intended for a single receiver,
      generate a first field of the preamble to include an indicator that the data unit is being transmitted in the single user mode,
      generate a second field of the preamble to include bits of an identifier of the single receiver, and
      generate a third field of the preamble to include one or more bits set to a value that indicates a number of spatial or space time streams corresponding to the data unit;

when the data unit is being transmitted in a multi-user mode in which the data unit is intended for multiple receivers,
generate the first field of the preamble to include an indicator that the data unit is being transmitted in the multi-user mode,
generate the second field of the preamble to include one or more indications of one or more numbers of spatial or space time streams, wherein the one or more indications of one or more numbers of spatial or space time streams correspond to transmission of the data unit to one or more receivers among the multiple receivers, and wherein bits used in the multi-user mode for the one or more indications of one or more numbers of spatial or space time streams correspond to at least some of bits used in the single user mode for the identifier of the single receiver, and
generate the third field of the preamble to include the one or more bits set to a value that indicates a number of spatial or space time streams corresponding to a first receiver among the multiple receivers; and
wherein the one or more integrated circuits are further configured to:
generate the preamble, and
generate the data unit to include the preamble.

6. The apparatus of claim 5, wherein:
the one or more indications of one or more numbers of spatial or space time streams correspond to transmission of the data unit to one or more second receivers among the multiple receivers, wherein the one or more second receivers among the multiple receivers correspond to one or more receiver, among the multiple receivers, other than the first receiver among the multiple receivers.

7. The apparatus of claim 5, wherein the one or more integrated circuits are configured to generate the second field of the preamble to include only a subset of bits of the identifier of the single receiver when the data unit is to be transmitted in the single user mode.

8. The apparatus of claim 5, wherein the one or more integrated circuits are configured to generate the second field of the preamble to include bits of an association identifier (AID) of the single receiver when the data unit is to be transmitted in the single user mode.

9. A method for processing a data unit received via a multiple input, multiple output (MIMO) communication channel, the method comprising:
processing, at a communication device, a first field of a preamble of a data unit to determine whether the data unit was transmitted in i) a single user mode in which the data unit is intended for a single receiver or ii) a multi-user mode in which the data unit is intended for multiple receivers;
when it is determined that the data unit was transmitted in the single user mode,
processing, at the communication device, a second field of the preamble that includes bits of an identifier of the single intended receiver to determine whether the data unit is intended for the communication device,
processing, at the communication device, a third field of the preamble to determine a number of spatial or space time streams for the data unit, wherein the number of spatial or space time streams for the data unit is determined based on a value of one or more bits included in the third field of the preamble, and
in response to determining that the data unit is not intended for the communication device, stopping processing of the data unit; and
when it is determined that the data unit was transmitted in the multi-user mode,
processing, at the communication device, the first field of the preamble to determine whether the data unit is intended for the communication device, and
processing, at the communication device, the second field of the preamble to determine a set of training signals in the preamble corresponding to transmission of the data unit to the communication device, wherein the second field of the preamble is received at the communication device prior to receiving the set of training signals,
wherein bits of the second field processed in the multi-user mode to determine the set of training signals correspond to bits of the second field processed in the single user mode for the identifier of the single intended receiver.

10. The method of claim 9, wherein:
when it is determined that the data unit was transmitted in the single user mode, processing the second field of the preamble to determine whether the data unit is intended for the communication device includes interpreting the second field of the preamble as including only a subset of bits of the identifier of the single intended receiver.

11. The method of claim 9, wherein:
when it is determined that the data unit was transmitted in the single user mode, processing the second field of the preamble to determine whether the data unit is intended for the communication device includes interpreting the second field of the preamble as including bits of an association identifier (AID) of the single intended receiver.

12. An apparatus, comprising
a physical layer (PHY) processing device having one or more integrated circuits configured to:
process a first field of a preamble of a data unit to determine whether the data unit was transmitted in i) a single user mode in which the data unit is intended for a single receiver or ii) a multi-user mode in which the data unit is intended for multiple receivers,
when it is determined that the data unit was transmitted in the single user mode,
process a second field of the preamble that includes bits of an identifier of the single intended receiver to determine whether the data unit is intended for the communication device,
process a third field of the preamble to determine a number of spatial or space time streams for the data unit, wherein the number of spatial or space time streams for the data unit is determined based on a value of one or more bits included in the third field of the preamble, and
in response to determining that the data unit is not intended for the communication device, stop processing of the data unit,
when it is determined that the data unit was transmitted in the multi-user mode,
process the first field of the preamble to determine whether the data unit is intended for the communication device, and
process the second field of the preamble to determine a set of training signals in the preamble corresponding to transmission of the data unit to the communication device, wherein the second field precedes the set of training signals in the preamble, wherein bits of the second field processed in the multi-user mode to determine the set of training signals correspond to bits of the second field processed in the single user mode for the identifier of the single intended receiver.

13. The apparatus of claim 12, wherein the one or more integrated circuits are further configured to:

when it is determined that the data unit was transmitted in the single user mode, interpret the second field of the preamble as including only a subset of bits of the identifier of the single intended receiver.

14. The apparatus of claim 12, wherein the one or more integrated circuits are further configured to:

when it is determined that the data unit was transmitted in the single user mode, interpret the second field of the preamble as including bits of an association identifier (AID) of the single intended receiver.

15. A tangible, non-transitory computer readable medium, or media, storing instructions that, when executed by one or more processors of a communication device, cause the one or more processors to:

control the communication device to generate a plurality of training sequences to be included in a preamble of the data unit;

when the data unit is to be transmitted by the communication device in a single user mode in which the data unit is intended for a single receiver,
  control the communication device to generate a first field of the preamble to include an indicator that the data unit is being transmitted in the single user mode,
  control the communication device to generate a second field of the preamble to include bits of an identifier of the single receiver, and
  control the communication device to generate a third field of the preamble to include one or more bits set to a value that indicates a number of spatial or space time streams corresponding to the data unit;

when the data unit is to be transmitted by the communication device in a multi-user mode in which the data unit is intended for multiple receivers,
  control the communication device to generate the first field of the preamble to include an indicator that the data unit is being transmitted in the multi-user mode, and
  control the communication device to generate the second field of the preamble to include one or more indications of one or more numbers of spatial or space time streams, wherein the one or more indications of one or more numbers of spatial or space time streams correspond to transmission of the data unit to one or more receivers among the multiple receivers, and wherein bits used in the multi-user mode for the one or more indications of one or more numbers of spatial or space time streams correspond to at least some of bits used in the single user mode for the identifier of the single receiver, and
  control the communication device to generate the third field of the preamble to include the one or more bits set to a value that indicates a number of spatial or space time streams corresponding to a first receiver among the multiple receivers;

control the communication device to generate the preamble; and control the communication device to generate the data unit to include the preamble.

16. The computer readable medium, or media, of claim 15, wherein:

the one or more indications of one or more numbers of spatial or space time streams correspond to transmission of the data unit to one or more second receivers among the multiple receivers, wherein the one or more second receivers among the multiple receivers correspond to one or more receivers, among the multiple receivers, other than the first receiver among the multiple receivers.

17. The computer readable medium, or media, of claim 15, wherein the second field of the preamble includes only a subset of bits of the identifier of the single receiver.

18. The computer readable medium, or media, of claim 15, wherein the computer readable medium, or media, further stores instructions that, when executed by the one or more processors, further cause the one or more processors to generate the second field of the preamble to include bits of an association identifier (AID) of the single receiver.

19. A tangible, non-transitory computer readable medium, or media, storing instructions that, when executed by one or more processors of a communication device, cause the one or more processors to:

control the communication device to process a first field of a preamble of a data unit to determine whether the data unit was transmitted in i) a single user mode in which the data unit is intended for a single receiver or ii) a multi-user mode in which the data unit is intended for multiple receivers;

when it is determined that the data unit was transmitted in the single user mode,
  control the communication device to process a second field of the preamble that includes bits of an identifier of the single intended receiver to determine whether the data unit is intended for the communication device,
  control the communication device to process a third field of the preamble to determine a number of spatial or space time streams for the data unit, wherein the number of spatial or space time streams for the data unit is determined based on a value of one or more bits included in the third field of the preamble, and
  in response to determining that the data unit is not intended for the communication device, control the communication device to process to stop processing of the data unit; and when it is determined that the data unit was transmitted in the multi-user mode,
  control the communication device to process the first field of the preamble to determine whether the data unit is intended for the communication device, and
  control the communication device to process the second field of the preamble to determine a set of training signals in the preamble corresponding to transmission of the data unit to the communication device, wherein the second field of the preamble is received at the communication device prior to receiving the set of training signals, wherein bits of the second field processed in the multi-user mode to determine the set of training signals correspond to bits of the second field processed in the single user mode for the identifier of the single intended receiver.

20. The computer readable medium, or media, of claim 19, wherein the computer readable medium, or media, further stores instructions that, when executed by the one or more processors, cause the one or more processors to:

when it is determined that the data unit was transmitted in the single user mode, control the communication device to interpret the second field of the preamble as including only a subset of bits of the identifier of the single intended receiver.

21. The computer readable medium, or media, of claim 19, wherein the computer readable medium, or media, further stores instructions that, when executed by the one or more processors, further cause the one or more processors to:

when it is determined that the data unit was transmitted in the single user mode, control the communication device to interpret the second field of the preamble as including bits of an association identifier (AID) of the single intended receiver.

* * * * *

Disclaimer

9,480,018 B2 — Yong Liu, Campbell, CA (US); Hongyuan Zhang, Fremont, CA (US); Raja Banerjea, Sunnyvale, CA (US); Mao Yu, San Jose, CA (US). PHY DATA UNIT FORMAT FOR MIMO. Patent dated October 25, 2016. Disclaimer filed December 11, 2018, by the assignee, Marvell International Ltd.

Hereby disclaims the term of this patent which would extend beyond Patent No. 8,724,546.

*(Official Gazette, February 5, 2019)*